US012478247B2

(12) United States Patent
Ito et al.

(10) Patent No.: US 12,478,247 B2
(45) Date of Patent: Nov. 25, 2025

(54) LIGHT SOURCE DEVICE, ENDOSCOPE SYSTEM, AND CONTROL METHOD

(71) Applicant: OLYMPUS CORPORATION, Tokyo (JP)

(72) Inventors: Takeshi Ito, Hino (JP); Masayoshi Saito, Hachioji (JP); Koki Morishita, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 572 days.

(21) Appl. No.: 17/831,649

(22) Filed: Jun. 3, 2022

(65) Prior Publication Data

US 2022/0287554 A1 Sep. 15, 2022

Related U.S. Application Data

(63) Continuation of application No. PCT/JP2019/047350, filed on Dec. 4, 2019.

(51) Int. Cl.
*A61B 1/06* (2006.01)
*A61B 1/00* (2006.01)
(Continued)

(52) U.S. Cl.
CPC ...... *A61B 1/0655* (2022.02); *A61B 1/000094* (2022.02); *A61B 1/05* (2013.01);
(Continued)

(58) Field of Classification Search
CPC .......... A61B 1/00009; A61B 1/000094; A61B 1/000095; A61B 1/000096; A61B 1/06;
(Continued)

(56) References Cited

U.S. PATENT DOCUMENTS 10,856,805 B2 * 12/2020 Morita ............... G06T 7/0014
2012/0197077 A1 * 8/2012 Kaku ............... A61B 1/000094
600/109

(Continued)

FOREIGN PATENT DOCUMENTS

WO  2013115323 A1  8/2013
WO  2016151672 A1  9/2016
WO  2017216878 A1  12/2017

OTHER PUBLICATIONS

International Search Report dated Jan. 7, 2020 issued in PCT/JP2019/047350.

*Primary Examiner* — Ryan N Henderson
(74) *Attorney, Agent, or Firm* — Scully, Scott, Murphy & Presser, P.C.

(57) ABSTRACT

A light source device includes a first light source, a second light source, and a processor. The processor controls, based on spectrum setting information, an emitted light amount of the first light source and an emitted light amount of the second light source so that the emitted light amount of the first light source becomes larger than the emitted light amount of the second light source. The observation object includes a region of interest, a merkmal, and a peripheral portion. The spectrum setting information is set based on a merkmal observed ratio that is a ratio between a spectral reflectance in the merkmal and a spectral reflectance in the peripheral portion. A degree of disassociation of the merkmal observed ratio in the first wavelength region from 1 is greater than a degree of disassociation of the merkmal observed ratio in the second wavelength region from 1.

16 Claims, 12 Drawing Sheets

(51) Int. Cl.
*A61B 1/05* (2006.01)
*A61B 1/273* (2006.01)

(52) U.S. Cl.
CPC .......... *A61B 1/0638* (2013.01); *A61B 1/0669* (2013.01); *A61B 1/2733* (2013.01)

(58) Field of Classification Search
CPC ... A61B 1/0638; A61B 1/0646; A61B 1/0653; A61B 1/0661; A61B 1/0669; A61B 1/0676; A61B 1/0684; G06T 2207/10068
See application file for complete search history.

(56) References Cited

U.S. PATENT DOCUMENTS

| | | | |
|---|---|---|---|
| 2014/0171764 A1 | 6/2014 | Kim et al. | |
| 2014/0316279 A1 | 10/2014 | Morishita | |
| 2014/0316283 A1* | 10/2014 | Kaku | A61B 1/000094 600/479 |
| 2017/0258307 A1* | 9/2017 | Daidoji | A61B 1/00006 |
| 2017/0340273 A1* | 11/2017 | Morita | A61B 5/14546 |
| 2018/0000334 A1 | 1/2018 | Morishita | |
| 2019/0045170 A1* | 2/2019 | Sugie | G06T 7/0012 |
| 2019/0087970 A1* | 3/2019 | Endo | A61B 1/000094 |
| 2019/0110673 A1* | 4/2019 | Ito | A61B 1/00096 |
| 2019/0117055 A1* | 4/2019 | Ito | G02B 23/2461 |
| 2020/0008653 A1* | 1/2020 | Kamon | A61B 1/00055 |
| 2021/0088772 A1* | 3/2021 | Morita | A61B 1/044 |

* cited by examiner

| TARGET | RV | RB | RG | RA | RR |
|---|---|---|---|---|---|
| β CAROTENE | NEGATIVE | POSITIVE | POSITIVE | NEUTRAL | NEGATIVE |
| NERVES | NEUTRAL | NEUTRAL | NEGATIVE | NEUTRAL | NEGATIVE |

LIGHT SOURCE DEVICE, ENDOSCOPE SYSTEM, AND CONTROL METHOD

CROSS REFERENCE TO RELATED APPLICATION

This application is a continuation of International Patent Application No. PCT/JP2019/047350, having an international filing date of Dec. 4, 2019, which designated the United States, the entirety of which is incorporated herein by reference.

BACKGROUND

In endoscope observation, when whether or not a region of interest is present or a possibility of presence of the region of interest is wanted to be known, a method of using a merkmal serving a landmark or an index has been known. International Publication No. 13/115323 discloses a method of focusing on fat as a merkmal for nerves, using a wavelength region B1 in which absorbance of β carotene included in fat is high, sequentially emitting light in a B1 wavelength region, light in a G1 wavelength region, and light in an R1 wavelength region toward an observation object, and thereby generating a white observation image.

SUMMARY

In accordance with one of some aspect, there is provided a light source device that generates illumination light to be emitted toward an observation object, the light source device comprising:
 a first light source that emits light having a peak wavelength in a first wavelength region;
 a second light source that emits light having a peak wavelength in a second wavelength region; and
 a processor, wherein
 the processor controls, based on spectrum setting information, an emitted light amount of the first light source and an emitted light amount of the second light source so that the emitted light amount of the first light source becomes larger than the emitted light amount of the second light source,
 the observation object includes a region of interest, a merkmal, and a peripheral portion,
 the merkmal represents a component being present in an area outside of the region of interest, the area being correlated to an area in which the region of interest is present,
 the peripheral portion represents outside of the region of interest, and excludes the merkmal,
 the spectrum setting information is set based on a merkmal observed ratio,
 the merkmal observed ratio is a ratio between a spectral reflectance in the merkmal and a spectral reflectance in the peripheral portion in each of a plurality of wavelength regions divided from a visible light wavelength region, and
 a degree of disassociation of the merkmal observed ratio in the first wavelength region from 1 is greater than a degree of disassociation of the merkmal observed ratio in the second wavelength region from 1.

In accordance with one of some aspect, there is provided an endoscope system including an endoscope that observes an observation object with an image sensor and a control device that generates illumination light to be emitted toward the observation object, the endoscope system comprising:
 a first light source that emits light having a peak wavelength in a first wavelength region;
 a second light source that emits light having a peak wavelength in a second wavelength region; and
 a processor, wherein
 the processor
  controls, based on spectrum setting information, an emitted light amount of the first light source and an emitted light amount of the second light source so that the emitted light amount of the first light source becomes larger than the emitted light amount of the second light source, and
  generates, based on an image signal output from the image sensor that captures an image of the observation object illuminated with the illumination light, an output image in which a merkmal is relatively highlighted from a peripheral portion,
 the observation object includes a region of interest, the merkmal, and the peripheral portion,
 the merkmal represents a component being present in an area outside of the region of interest, the area being correlated to an area in which the region of interest is present,
 the peripheral portion represents outside of the region of interest, and excludes the merkmal,
 the spectrum setting information is set based on a merkmal observed ratio,
 the merkmal observed ratio is a ratio between a spectral reflectance in the merkmal and a spectral reflectance in the peripheral portion in each of a plurality of wavelength regions divided from a visible light wavelength region, and
 a degree of disassociation of the merkmal observed ratio in the first wavelength region from 1 is greater than a degree of disassociation of the merkmal observed ratio in the second wavelength region from 1.

In accordance with one of some aspect, there is provided a control method for a light source device that generates illumination light to be emitted toward an observation object, the method comprising:
 controlling by a processor, based on spectrum setting information, an emitted light amount of a first light source that emits light having a peak wavelength in a first wavelength region and an emitted light amount of a second light source that emits light having a peak wavelength in a second wavelength region so that the emitted light amount of the first light source becomes larger than the emitted light amount of the second light source, wherein
 the observation object includes a region of interest, a merkmal, and a peripheral portion,
 the merkmal represents a component being present in an area outside of the region of interest, the area being correlated to an area in which the region of interest is present,
 the peripheral portion represents outside of the region of interest, and excludes the merkmal,
 the spectrum setting information is set based on a merkmal observed ratio,
 the merkmal observed ratio is a ratio between a spectral reflectance in the merkmal and a spectral reflectance in the peripheral portion in each of a plurality of wavelength regions divided from a visible light wavelength region, and
 a degree of disassociation of the merkmal observed ratio in the first wavelength region from 1 is greater than a degree of disassociation of the merkmal observed ratio in the second wavelength region from 1.

DESCRIPTION OF EMBODIMENTS

Figure 1:
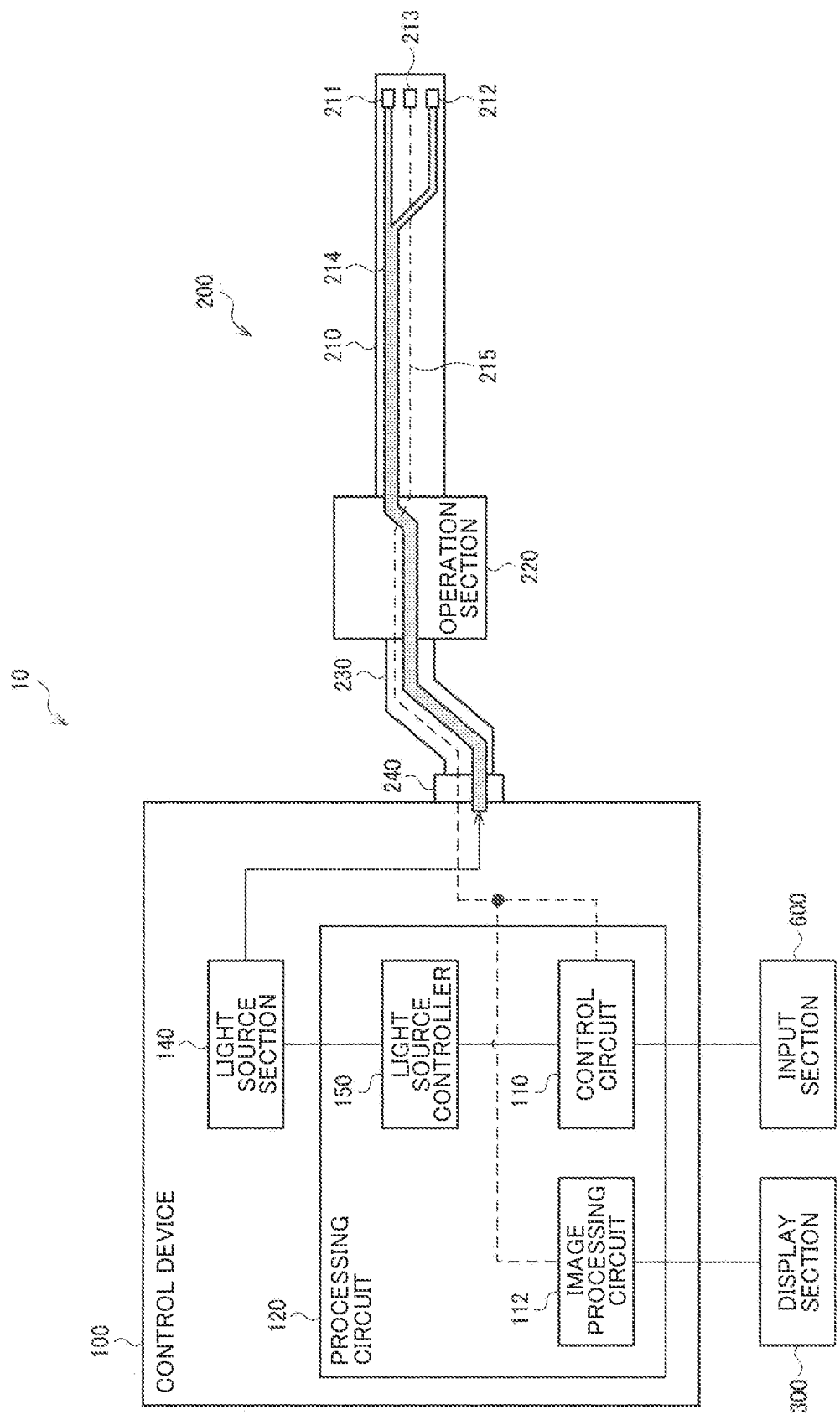
FIG. 1 illustrates a configuration example of an endoscope apparatus.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

1. Endoscope Apparatus

FIG. 1 illustrates a configuration example of an endoscope apparatus 10. Note that a description about a configuration and operation that are common to a typical endoscope is omitted, and the following description is given mainly of feature parts related to the present disclosure. In addition, the following description is given using an example of a medical endoscope for digestive organs, but an application target of the present disclosure is not limited thereto. That is, the endoscope mentioned in the present specification is assumed to be equipment in general provided with an insertion section for observing internal surfaces of recessed portions of various objects. For example, the endoscope is a medical endoscope used for medical examination of the living body or surgery.

The endoscope apparatus 10 illustrated in FIG. 1 includes a control device 100, a scope 200, a display section 300, and an input section 600. Note that the control device 100 is also referred to as a control device for an endoscope. The display section 300 is also referred to as a display or a display device. The input section 600 is also referred to as an input device or an operation device. First, a configuration of the endoscope apparatus 10 is described.

The scope 200 includes an insertion section 210, an operation section 220, a connection cable 230, and a connector 240. The insertion section 210 can be inserted into a body cavity of the living body. In a case of a flexible scope for digestive organs or the like, the insertion section 210 has flexibility. In a case of a rigid scope for surgery or the like, the insertion section 210 is not deformed. The body cavity of the living body is an observation object in the present embodiment. A user such as a physician grasps the operation section 220, and uses the operation section 220 to operate the endoscope apparatus 10. The connection cable 230 is a cable that connects the control device 100 and the scope 200. The connector 240 is arranged at one end of the connection cable 230, and makes the control device 100 and the scope 200 detachable.

At a leading end of the insertion section 210, arranged are illumination lenses 211 and 212 emitting illumination light toward the observation object, and an imaging section 213 that receives illumination light reflected or scattered on a surface of the observation object to capture an image. The imaging section 213 is also referred to as an imaging section or an imaging device.

The scope 200 is provided with a light guide 214. The light guide 214 is optically connected to the illumination lenses 211 and 212. The control device 100 is provided with a light source section 140. The light guide 214 guides illumination light emitted from the light source section 140 to the illumination lenses 211 and 212. The light guide 214 is a light guide such as an optical fiber bundle. The light guide extends from the connector 240, by way of the inside of the connection cable 230 and the operation section 220, to the illumination lenses 211 and 212.

The illumination lenses 211 and 212 diffuse illumination light guided by the light guide to be at a desired radiation angle. Each of the illumination lenses 211 and 212 is an illumination optical system made of one lens or a plurality of lenses.

The imaging section 213 includes an imaging optical system and an image sensor. The image sensor is, for example, a complementary metal-oxide semiconductor (CMOS)-type imager. The imager is a Bayer-type imager on which a red (R), green, (G), and blue (B) primary color filter in a Bayer array is mounted, a complementary color imager on which a complementary color filter is mounted, or a monochrome imager. The monochrome imager is used for a scope in a frame sequential method. Note that a charge-coupled device (CCD) other than the CMOS-type imager may be used as the image sensor.

The scope 200 is provided with an image signal line 215, which transmits an image signal of an image captured by the imaging section 213 to the control device 100. The image signal line 215 is arranged inside the insertion section 210, the operation section 220, and the connection cable 230, and is connected so as to be capable of transmitting a video signal to the control device 100 via the connector 240. Note that the image signal line 215 may alternatively be an optical fiber for optical communication or the like.

The control device 100 includes the light source section 140 that emits illumination light, and a processing circuit 120. The processing circuit 120 includes a control circuit 110 that controls each unit of the endoscope apparatus 10, an image processing circuit 112 that performs an image process on an image signal from the imaging section 213, and a light source controller 150 that controls the light source section 140.

The processing circuit 120 is implemented by a circuit device in which a plurality of circuit components is mounted on a substrate. Alternatively, the processing circuit 120 may be an integrated circuit device such as a processor and an application-specific integrated circuit (ASIC). In a case where the processing circuit 120 is the processor, the processor executes a program in which operations of the processing circuit 120 are described, and thereby implements the operations of the processing circuit 120. The program is, for example, stored in a memory, which is not illustrated. Note that the control circuit 110, the image processing circuit 112, and the light source controller 150 included in the processing circuit 120 may be mounted on one substrate, or may be mounted on a plurality of substrates. For example, the light source controller 150 may be mounted on a first substrate, and the control circuit 110 and the image processing circuit 112 may be mounted on a second substrate. In this case, the light source section 140 and the first substrate may constitute the light source device.

The display section 300 displays an image of the observation object subjected to the image process by the image processing circuit 112. The display section 300 is a display device of various types used in general, and is, for example, a liquid crystal monitor, or the like. The display section 300 is electrically connected to the control device 100 by electric wiring that transmits an image signal.

The input section 600 accepts an operation from the user, and outputs information of the operation to the processing circuit 120. The input section 600 is, for example, a button, a dial, a keyboard, a mouse, a touch panel, or the like. The touch panel may be arranged on the display section 300. Alternatively, the input section 600 may be an interface that is connected to an information processing device such as a personal computer (PC). The interface accepts input information from the information processing device, and outputs the input information to the control circuit 110. The interface is, for example, a communication interface, such as a universal serial bus (USB) and a local area network (LAN).

The light source section 140 includes a plurality of light sources that emits a plurality of types of light having mutually different wavelengths. The plurality of light sources is, for example, three or more light sources. The light source section 140 causes the plurality of types of light to be incident on the scope 200 as illumination light. Each light source is, for example, a light emitting diode (LED) light source, a semiconductor laser light source, or super luminescent diode (SLD) light source. Alternatively, each light source may be a light source that combines a laser and a phosphor. Using the SLD enables implementation of a light source having a wavelength region that is narrower than the LED and exhibiting high luminance By combining the phosphor and the laser, it is possible to emit light having various wavelengths with high luminance With usage of the laser, it is possible to guide high-luminance light to the light guide with high efficiency. Alternatively, a light source that combines lamp light and a filter may be used. The filter is arranged on an optical path from a lamp to an incident end of the light guide. For example, a rotary filter includes a plurality of filters having mutually different transmissive wavelengths, and rotation of the rotary filter implements emitted light from each light source.

The light source controller 150 controls an emitted light amount of each light source included in the light source section 140. Specifically, the light source controller 150 controls an emitted light amount ratio of the plurality of light sources, and thereby controls a spectral shape of illumination light. The light source controller 150 can include, for example, a driving circuit that drives a light source, and a driving control circuit or a processor that controls the driving circuit. Alternatively, in a case where the driving circuit is included in the light source, the light source controller 150 may be a driving control circuit or a processor that controls the driving circuit of the light source.

Subsequently, operations of the endoscope apparatus 10 in accordance with the present embodiment are described. In a case where a spectral feature of the region of interest is less significant than that in a peripheral portion, the endoscope apparatus 10 in accordance with the present embodiment highlights a merkmal to present a possibility for presence of the region of interest to the user. Specifically, the endoscope apparatus 10 controls the spectral shape of illumination light, or performs an image process to achieve an image as if being irradiated with the illumination light, and thereby improves visibility of the merkmal.

First, the region of interest, the merkmal, and the peripheral portion included in the observation object in accordance with the present embodiment are now described with reference to FIG. 2.

Figure 2:
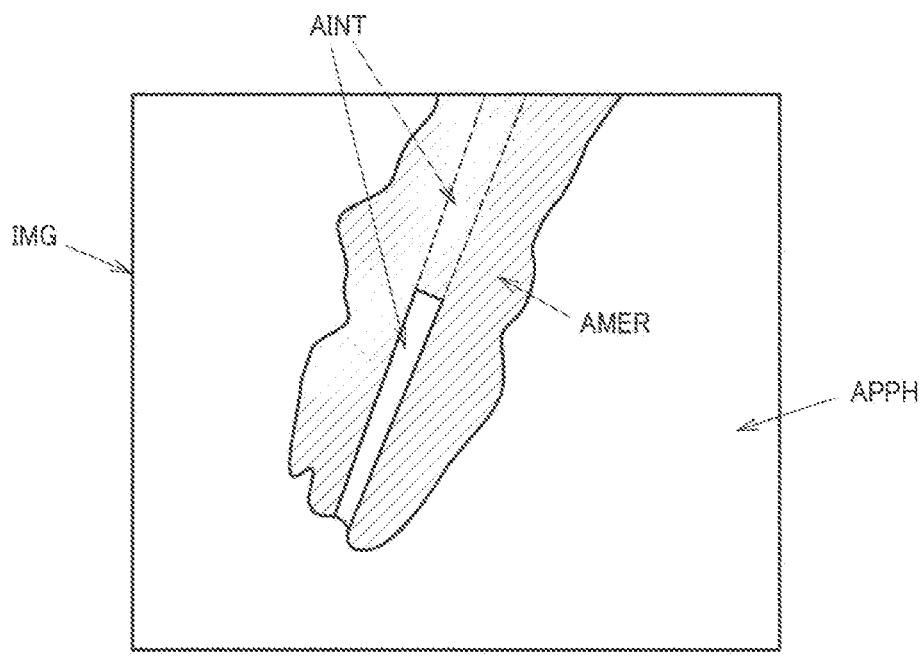
FIG. 2 illustrates an image example of an observation object captured by the endoscope apparatus.

IMG illustrated in FIG. 2 is an example of an image of the observation object captured by the endoscope apparatus 10. The observation object includes a region of interest AINT, a merkmal AMER, and a peripheral portion APPH. FIG. 2 illustrates an example in which the region of interest AINT, the merkmal AMER, and the peripheral portion APPH are present within an angle of view of the image IMG. The angle of view of the image IMG is an angle of view determined by an optical system of the imaging section 213 and the image sensor. Alternatively, the angle of view of the image IMG may be an angle of view when the image IMG is displayed on the display section 300.

The region of interest AINT is a portion to which a physician pays attention in the observation object. Specifically, the region of interest AINT is tissues that are wanted to be identified in medical examination, treatment, or surgery, a lesion that is wanted to be detected in screening, a lesion that serves a target of medical examination or treatment, or the like. The region of interest AINT is not necessarily seen in the image IMG in an exposed state, and may be in a state of being partially or entirely covered with other tissues even if being within the angle of view. In FIG. 2, an exposed region of interest AINT is indicated by solid lines, and an unexposed region of interest AINT is indicated by dotted lines.

The merkmal AMER is present in an area other than the region of interest AINT, and is a component whose presence area is correlated to a presence area of the region of interest AINT. The presence area being correlated means that there is a possibility that the merkmal AMER is present in the neighborhood of the region of interest AINT, or the merkmal AMER is present exclusively in the neighborhood of the region of interest AINT. For example, the merkmal AMER corresponds to a component included in tissues or an organ that is/are highly likely to appear with the region of interest AINT or a component included in tissues or an organ that is/are present side by side with the region of interest AINT, medicine to be sprayed or injected into a blood vessel when the observation object is observed, or the like. A description is now given of "there is a possibility that the merkmal AMER is present in the neighborhood of the region of interest AINT" using an example of nerves and fat. If nerves serving as the region of interest are present, fat serving as the merkmal is highly likely to be present. In contrast, considering a case where fat is present, there can be a case where nerves are actually present in the neighborhood of fat, and a case where nerves are not present in the neighborhood of fat. Fat serving as the merkmal is only required to have a possibility of being present in the neighborhood of nerves serving as the region of interest, and thus may include both fat in the neighborhood of which nerves serving as the region of interest are actually present, and fat in the neighborhood of which nerves are not present.

The peripheral portion APPH is a portion other than the region of interest AINT in the observation object, and is a portion not including the merkmal AMER. For example, in the endoscope for digestive organs, a mucosa of the digestive tract corresponds to the peripheral portion APPH. In the endoscope for surgery, a surgery target and surfaces of an organ or tissues that is/are present in the periphery of the surgery target correspond to the peripheral portion APPH. Note that the peripheral portion APPH may be in an unexposed state in the image IMG by being covered with medicine, blood, or the like.

Figure 3:
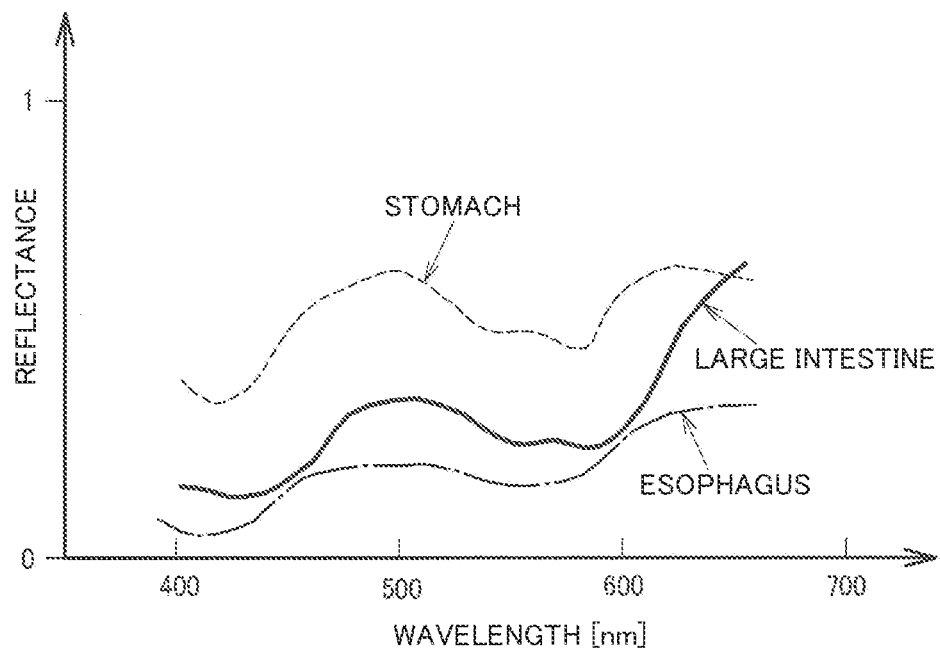
FIG. 3 illustrates spectral reflectances in the stomach, the large intestine, and the esophagus.

FIG. 3 illustrates spectral reflectances in the stomach, the large intestine, and the esophagus, which are representative organs each serving as the observation object of the endoscope, as examples of spectral reflectances in the peripheral portion APPH. The spectral reflectance is a characteristic of a reflectance with respect to a wavelength of light, and is called an optical spectrum or a spectrum. Assume that notation such as 400 nm represents a wavelength.

As illustrated in FIG. 3, in a visible light wavelength region, there is a tendency that the reflectance in the stomach is the highest, while the reflectance in the esophagus is the lowest. However, the stomach, the esophagus, and the large intestine have approximately common spectral shapes. That is, there are minimums of the spectra around 420 nm and 550 nm, and there are maximums around 500 nm. When the wavelength exceeds 600 nm, the spectra of the esophagus and the large intestine increase in an almost monotonous manner. The spectrum of the stomach has a maximum around 630 nm, and exhibits a tendency that the reflectance somewhat decreases in a long wavelength side of the maximum. In the spectrum of the large intestine, an increment of the reflectance is somewhat large on the long wavelength side of 600 nm. However, the reflectances in the stomach and the esophagus are also high in this region, and this is not a significant feature.

In a case where the spectral feature of the region of interest AINT is less significant than that in the peripheral portion APPH, that is, in a case where a difference between the spectral reflectance in the region of interest AINT and that of the peripheral portion APPH is small, it is difficult to highlight the region of interest AINT from the peripheral portion APPH using a spectral method.

In the present embodiment, the light source controller 150 controls the spectral shape of illumination light using the spectrum setting information based on a merkmal observed ratio, and thereby relatively highlights the merkmal AMER from the peripheral portion APPH. Alternatively, the image processing circuit 112 performs an image process to highlight the merkmal based on the spectrum setting information in the image IMG captured with the observation object, and thereby relatively highlights the merkmal AMER from the peripheral portion APPH.

The merkmal observed ratio is a ratio between the spectral reflectance in the merkmal AMER and the spectral reflectance in the peripheral portion APPH in each of a plurality of wavelength regions divided from the visible light wavelength region. For example, as described later with reference to FIG. 4, the plurality of wavelength regions includes a violet region, a blue region, a green region, an amber region, and a red region. A ratio between the spectral reflectance in the merkmal AMER and the spectral reflectance in the peripheral portion APPH in each color region is the merkmal observed ratio. Note that the plurality of wavelength regions is only required to be three or more wavelength regions.

The spectrum setting information is information for setting the spectral shape of illumination light, and is a light amount ratio of illumination light in each of the plurality of wavelength regions. In the example illustrated in FIG. 4, a ratio among a light amount of a violet region RV, a light amount of a blue region RB, a light amount of a green region RG, a light amount of an amber region RA, and a light amount of a red region RR is the spectrum setting information. The light source controller 150 causes the plurality of light sources to emit light with a light amount ratio indicated by the spectrum setting information, and thereby increases visibility of the merkmal AMER. Alternatively, the image processing circuit 112 performs a gain process on a component of each wavelength region in the image captured by emission of normal light with a gain ratio corresponding to the light amount ratio indicated by the spectrum setting information, and thereby generates an image as if being captured by emission of illumination light with the light amount ratio indicated by the spectrum setting information. Accordingly, an image process that is equivalent to highlighting of the merkmal with illumination light is implemented. The gain process mentioned herein is processing to amplify or attenuate a component in each wavelength region of the captured image in the image process. At this time, a degree of amplification or attenuation is the gain ratio, which is set based on the light amount ratio indicated by the spectrum setting information.

In the present embodiment, the spectral shape of illumination light is set from the spectrum setting information based on the merkmal observed ratio or the image process is performed, whereby the merkmal AMER is relatively highlighted from the peripheral portion APPH. This can increase visibility of the merkmal AMER in the display image, and thereby makes it easier for the user to recognize the presence of the region of interest AINT accompanied by the merkmal AMER.

Specifically, assume that a ratio between the spectral reflectance in the region of interest AINT included in the observation object and the spectral reflectance in the peripheral portion APPH in each of the plurality of wavelength regions is a region-of-interest observed ratio. At this time, among the plurality of wavelength regions, there is a wavelength region in which a degree of disassociation of the merkmal observed ratio from 1 is greater than a degree of disassociation of the region-of-interest observed ratio from 1. Assume that this wavelength region is an i-th wavelength region. For example, when visible light is divided into five, i is an integer that is equal to or greater than 1 and equal to or less than 5. The degree of disassociation is an absolute value of a difference between an observed ratio and 1. That is, in the i-th wavelength region, the merkmal observed ratio may be higher or lower than 1, and the region-of-interest observed ratio may be higher or lower than 1.

The ratio between the two spectral reflectances being close to 1 means that the difference between the two spectral reflectances is small. That is, it can be said that the spectral feature of the merkmal becomes more significant with respect to the peripheral portion as the merkmal observed ratio becomes more away from 1. The degree of disassociation of the merkmal observed ratio from 1 being greater than the degree of disassociation of the region-of-interest observed ratio from 1 means that the spectral feature of the merkmal AMER becomes more significant with respect to the peripheral portion APPH than the spectral feature of the region of interest AINT.

In the present embodiment, in a case where the spectral feature of the merkmal AMER is more significant than that of the region of interest AINT as described above, increasing visibility of the merkmal AMER can indirectly increase visibility of the region of interest AINT that has a less significant spectral feature.

In addition, it can also be said that the spectral feature of the region of interest AINT is more similar to the spectral feature of the peripheral portion APPH than the spectral feature of the merkmal AMER. That is, in a case where the region of interest AINT is exposed, highlighting the merkmal AMER spectrally differentiates the merkmal AMER and the region of interest AINT, and thereby increases a possibility that the region of interest AINT can be relatively recognized. Assume a case where the region of interest AINT is surrounded by the merkmal AMER like nerves surrounded by fat. When a non-highlighted region is present in the highlighted merkmal AMER, it can be assumed that the region of interest AINT is present in the region.

In the present embodiment, among the plurality of wavelength regions, there may further be a k-th wavelength region in which a degree of disassociation of the merkmal observed ratio from 1 is greater than a degree of disassociation of the region-of-interest observed ratio from 1. For example, when visible light is divided into five, k is an integer that is equal to or greater than 1 and equal to or less than 5, and k≠1. That is, in the k-th wavelength region, the merkmal observed ratio may be higher or lower than 1, and the region-of-interest observed ratio may be higher or lower than 1. A magnitude relationship between each observed ratio and 1 may be different from a magnitude relationship in the i-th wavelength region.

In this manner, there may be two wavelength regions in which the spectral feature of the merkmal AMER is more significant than that of the region of interest AINT. Increasing visibility of the merkmal AMER using the spectral features in such two wavelength regions can increase visibility of the region of interest AINT that has a less significant spectral feature. Note that there may be three or more wavelength regions in which the spectral feature of the merkmal AMER is more significant than that of the region of interest AINT, and visibility of the merkmal AMER may be increased using spectral features of such three or more wavelength regions.

A detailed definition of the merkmal is as follows. That is, assume that a component included in tissues or an organ that are/is present in the periphery of the region of interest is a peripherally present component. (A) Assume that among peripherally present components, a component whose presence area roughly overlaps with the region of interest is a region-of-interest index component. (B) Assume that among peripherally present components, a component whose presence area is exclusive of the region of interest is a region-of-interest exclusive component. (C) A spectral characteristic difference component is defined as follows. That is, a difference between an average spectral characteristic of the observation object and a spectral characteristic of the spectral characteristic difference component is larger than a difference between the spectral characteristic of the region of interest and the spectral characteristic of the spectral characteristic difference component.

The merkmal is a component that satisfies (A) and (C), or a component that satisfies (B) and (C). The merkmal is also referred to as an indirect index component. It can be said that the features of (A) or (B) allows the merkmal to indirectly indicate the presence of the region of interest. In addition, it can be said that the feature of (C) allows the merkmal to more easily increase visibility of the image using the spectral method than the region of interest does. In the present embodiment, increasing visibility of the merkmal can indirectly increase visibility of the region of interest.

To utilize the above-mentioned features of the merkmal to enhance visibility, the present embodiment sets the optical spectrum of illumination light depending on a spectral characteristic of the merkmal. That is, the present embodiment uses illumination light in a wavelength region that exhibits a large difference in spectral characteristics between the merkmal and a peripheral region. In addition, the present embodiment uses an image process that highlights the image in a wavelength region that exhibits a large difference in spectral characteristics between the merkmal and the peripheral region in accordance with the spectral characteristic of the merkmal. Alternatively, either the illumination light or the image process may be used, or both thereof may be combined.

As described with reference to FIG. 2, the esophagus, the stomach, and the large intestine each serving as the observation object of the endoscope have approximately similar reflectance spectral patterns, and minute differences in minimum and maximum are represented as differences in tone. For example, an operative method is wanted to be performed while positions of nerves are grasped in a procedure of treatment, but the spectral characteristic of nerves is similar to the spectral characteristics of the esophagus, the stomach, and the large intestine, as described later with reference to FIG. 4. For this reason, it is difficult to increase visibility of nerves using spectral approach. In the large intestine, a tendency appears to be different on a long wavelength side of 630 nm, but a reflectance in biological tissues is generally high in this wavelength region, and thus the large intestine is tinged with red. Thus, it is difficult to increase visibility only with illumination light in a color region on the long wavelength side of 630 nm.

In accordance with the present embodiment, illumination light in accordance with the spectral characteristic of the merkmal included in the observation object is emitted toward an object, the illumination light reflected or scattered by the object is received, an image signal is structured, and an image in which visibility of the merkmal is increased is structured based on the structured image signal. Due to the feature (A) or (B), the presence area of the merkmal is correlated to that of the region of interest. Due to the feature of (C), the spectral characteristic of the merkmal is more different from the spectral characteristic of the peripheral region than the spectral feature of the region of interest. Thus, the merkmal exhibits a higher level of increase of visibility. Accordingly, increasing visibility of the merkmal indirectly increases visibility of the region of interest, and can thereby further increase the level of increase of visibility in comparison with a case of directly increasing visibility of the region of interest.

Note that since the merkmal is not the region of interest itself, the endoscope apparatus 10 may have the following functions.

The light source controller 150 may set the spectral shape of illumination light based on both the spectral characteristic of the merkmal and the spectral characteristic of the region of interest. Alternatively, the image processing circuit 112 may set the wavelength region that is highlighted by the image process based on both the spectral characteristic of the merkmal and the spectral characteristic of the region of interest. In this case, the spectrum setting information is information based on both a difference in spectral characteristics between the merkmal and the peripheral portion and a difference in spectral characteristics between the region of interest and the peripheral portion.

With the usage of the spectral feature of the region of interest, it can be expected to increase, in addition to visibility of the merkmal, visibility of the region of interest. That is, while a spectral difference between the region of interest and the peripheral portion is small, the present embodiment takes into consideration of the difference and can thereby spectrally highlight the region of interest from the peripheral portion even by a little.

In addition, the endoscope apparatus 10 may have a merkmal highlighting mode for increasing visibility of the merkmal and a region-of-interest highlighting mode for highlighting the region of interest. For example, the control circuit 110 switches a mode based on information input by the user from the operation section 220 or the input section 600. At this time, there may be a sequence that enables sequentially switching with one button among the merkmal highlighting mode, the region-of-interest highlighting mode, and a normal light observation mode. The normal light observation mode is a mode for observing the observation object with normal light such as white light.

In addition, a plurality of merkmals may be settable. In this case, the light source controller 150 may set the spectral shape of illumination light so as to simultaneously highlight two or more merkmals among the plurality of merkmals, or may set the spectral shape of illumination light so as to highlight one merkmal among the plurality of merkmals. Additionally, the image processing circuit 112 may perform an image process so as to simultaneously highlight two or more merkmals among the plurality of merkmals, or may perform an image process so as to highlight one merkmal among the plurality of merkmals. In addition, the endoscope apparatus 10 may have a mode for simultaneously highlighting two or more merkmals, and a mode for highlighting one merkmal. At this time, the endoscope apparatus 10 may be able to further set a mode for determining which merkmal is to be highlighted. For example, the control circuit 110 switches a mode based on information input by the user from the operation section 220 or the input section 600. At this time, there may be a sequence that enables sequentially switching of the above-mentioned modes with one button.

Note that the operations of the endoscope apparatus 10 described above may be implemented as an observation method. The observation method is a method of observing the observation object based on reflected light from the observation object irradiated with illumination light. The observation method is to set the spectral shape of illumination light using the spectrum setting information based on the merkmal observed ratio and generate illumination light having the set spectral shape, and thereby relatively highlight the merkmal from the peripheral portion. Alternatively, the observation method is to perform an image process that highlights the merkmal based on the spectrum setting information in the image captured with the observation object, and thereby relatively highlight the merkmal from the peripheral portion. The above-mentioned observation method may be, for example, an operation method of the endoscope apparatus 10. Note that the operations of the endoscope apparatus 10 according to first to fourth embodiments described below may be implemented as the observation method.

2. First Embodiment

Detailed embodiments are described below. Note that the following embodiments may be combined as appropriate. While the following description will be given using a specific example of the region of interest and the like, the specific example is merely an example of the region of interest and the like, and the region of interest and the like are only required to have the above-described features.

The first embodiment is now described using an example of medical treatment of the periphery of the large intestine. For example, nerves around a portion subjected to surgery are desired to be preserved in extirpative surgery of the large intestine. In the first embodiment, the region of interest is nerves, the merkmal is β carotene included in fat that is highly likely to appear with the nerves, and the peripheral portion is the large intestine and an organ or tissues in the periphery of the large intestine and is a portion excluding nerves and fat. β carotene is an example of the merkmal that is present in the neighborhood of the region of interest, that is, an example of the region-of-interest index component.

Although the following description is given using an example of a case where β carotene serves as the merkmal, either fat or β carotene may serve as the merkmal for nerves. When fat serves as the merkmal, the spectral reflectance in fat is used as the spectral reflectance in the merkmal. When β carotene serves as the merkmal, the spectral reflectance in β carotene is used as the spectral reflectance in the merkmal. Since β carotene is included in fat, fat is tinged with a yellowish color as compared with the peripheral portion. Since it is known that β carotene is representative of this yellowish color of fat, the spectral reflectance in β carotene is used as the spectral reflectance in the merkmal.

Figure 4:
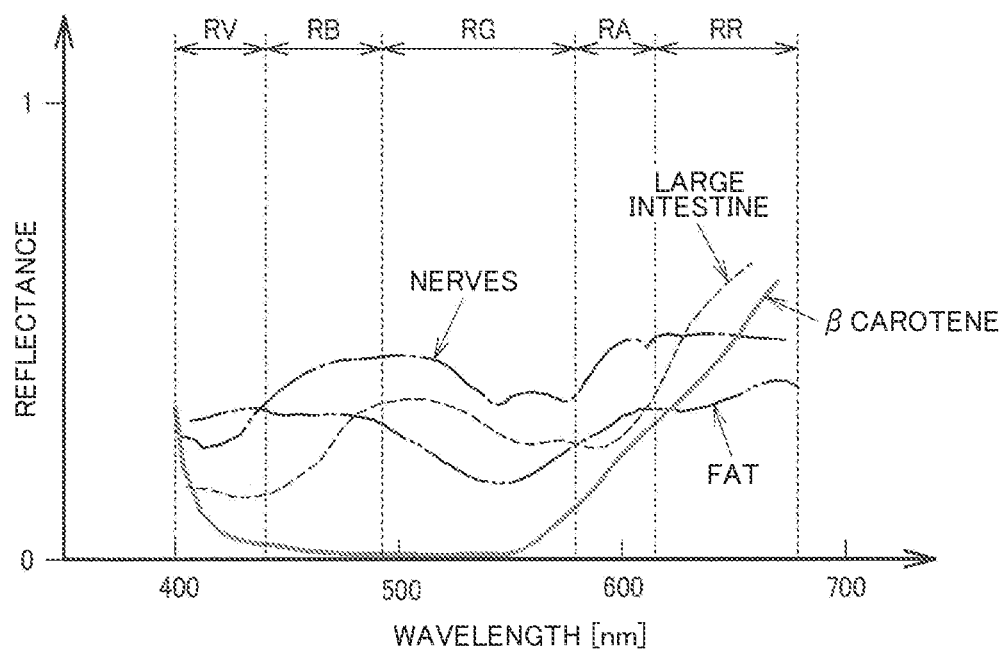
FIG. 4 illustrates spectral reflectances in the large intestine, fat, nerves, and β carotene.

FIG. 4 illustrates spectral reflectances in the large intestine, fat, nerves, and β carotene. The spectral reflectance in the large intestine is the spectral reflectance in the mucosa of the large intestine. The spectral reflectance in fat is the spectral reflectance in entire fat including β carotene.

As illustrated in FIG. 4, the spectral reflectance in nerves is somewhat higher than the spectral reflectance in the large intestine in the entire visible light wavelength region, but exhibits an approximately identical tendency to that of the spectral reflectance in the mucosa of the large intestine. Specifically, the spectral reflectance in nerves has a minimum between 400 nm to 450 nm and a maximum around 500 nm, and increases on a long wavelength side of 600 nm.

Assume that the visible light wavelength region is 400 nm≤$\lambda$≤680 nm. $\lambda$ represents a wavelength. This visible light wavelength region is divided into the following five color regions.

A violet region RV: 400 nm≤$\lambda$≤440 nm
A blue region RB: 440 nm<$\lambda$≤495 nm
A green region RG: 495 nm<$\lambda$≤585 nm
An amber region RA: 585 nm<$\lambda$≤615 nm
A red region RR: 615 nm<$\lambda$≤680 nm Assume that (the spectral reflectance in nerves)/(the spectral reflectance in the large intestine) in each color region described above is referred to as the region-of-interest observed ratio. The spectral reflectance in a color region means a value obtained by integrating spectral reflectances in the color region. As described above, since the spectral reflectances in nerves and the large intestine exhibit approximately identical tendencies, the region-of-interest observed ratios in each of the five color regions is approximately constant. The region-of-interest observed ratio in each color region is in a range from 1.0 to 2.0, and a difference between the spectral reflectance in nerves and the spectral reflectance in the large intestine is small. Thus, no spectral feature in such a level as that enables increase of visibility of nerves can be seen.

Although there is a slight difference in tendencies between the spectral reflectance in fat that is present in the neighborhood of nerves and the spectral reflectance in the large intestine, a value of (the spectral reflectance in fat)/(the spectral reflectance in the large intestine) is equal to or greater than 0.8 and equal to or less than 2.0, and there is no significant feature of the spectral reflectance in fat with respect to the spectral reflectance in the large intestine.

In contrast, paying attention to β carotene included in fat, β carotene has a feature in the spectral characteristic with respect to the spectral reflectance in the large intestine. Assume that (the spectral reflectance in (β carotene)/(the spectral reflectance in the large intestine) is referred to as the merkmal observed ratio. As illustrated in FIG. 4, the spectral reflectance in β carotene is almost zero from 450 nm to 550 nm, and increases in an approximately monotonous manner when the wavelength exceeds 550 nm. For this reason, the merkmal observed ratio is below 1/10 in the blue region RB and the green region RG. In addition, the merkmal observed ratio is about 0.8 in the violet region RV, about 0.5 in the amber region RA, and about 0.9 in the red region RR. That is, light in the blue region RB and the green region RG each having a high merkmal observed ratio is reflected on the large intestine by about 20% to 40%, but is reflected on β carotene by merely several percent and almost entirely absorbed. For this reason, in the image formed by light in the blue region RB and the green region RG, β carotene is absorbed and becomes dark, while the large intestine is more brightly drawn.

Hence, β carotene is (A) the region-of-interest index component and (C) the spectral characteristic difference component, and thus serves as the merkmal. Light in each of the blue region RB and the green region RG is light with which β carotene that is present in fat is drawn, and that thereby enables indirect drawing of nerves. Assume that light that enables indirect drawing of the region of interest is referred to as visibility increasing light. Light in the amber region RA is light that allows indirect drawing of the region of interest, although not so effective as the visibility increasing light. Assume that such light is referred to as quasi-visibility increasing light.

Specifically, the visibility increasing light is defined as follows. The non-visibility increasing light is light with which a visibility increasing effect cannot be expected.

Visibility increasing light: the merkmal observed ratio<0.3, or 3<the merkmal observed ratio Quasi-visibility increasing light: 0.3<the merkmal observed ratio<0.75, or 1.5<the merkmal observed ratio<3.

Non-visibility increasing light: 0.75<the merkmal observed ratio<1.5

The endoscope apparatus 10 in accordance with the present embodiment sets the spectral shape of illumination light by using the spectrum setting information based on the above-mentioned merkmal observed ratio. A detailed configuration example is described below.

Figure 5:
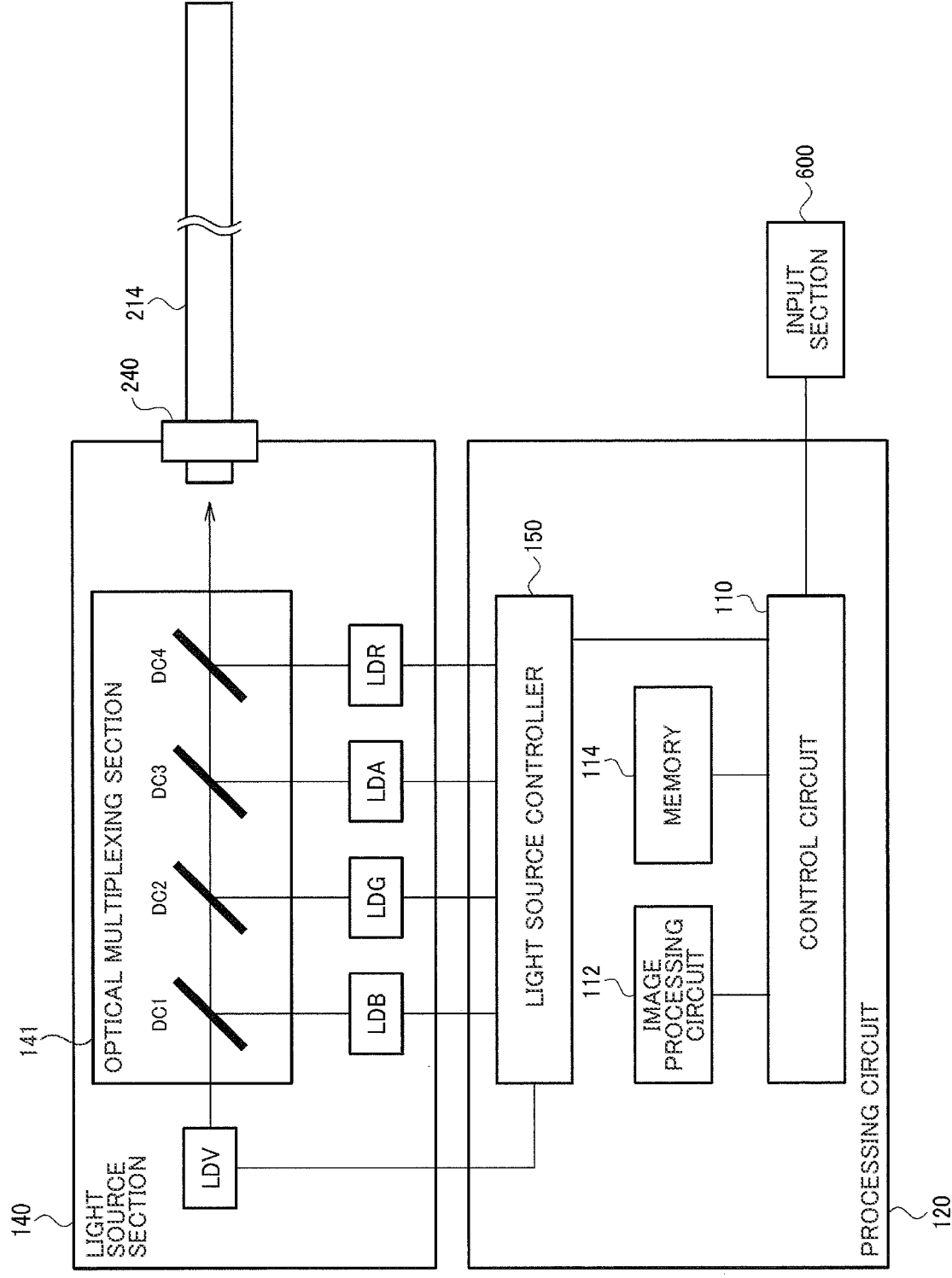
FIG. 5 illustrates a detailed configuration example of a light source section and a processing circuit.
Figure 6:
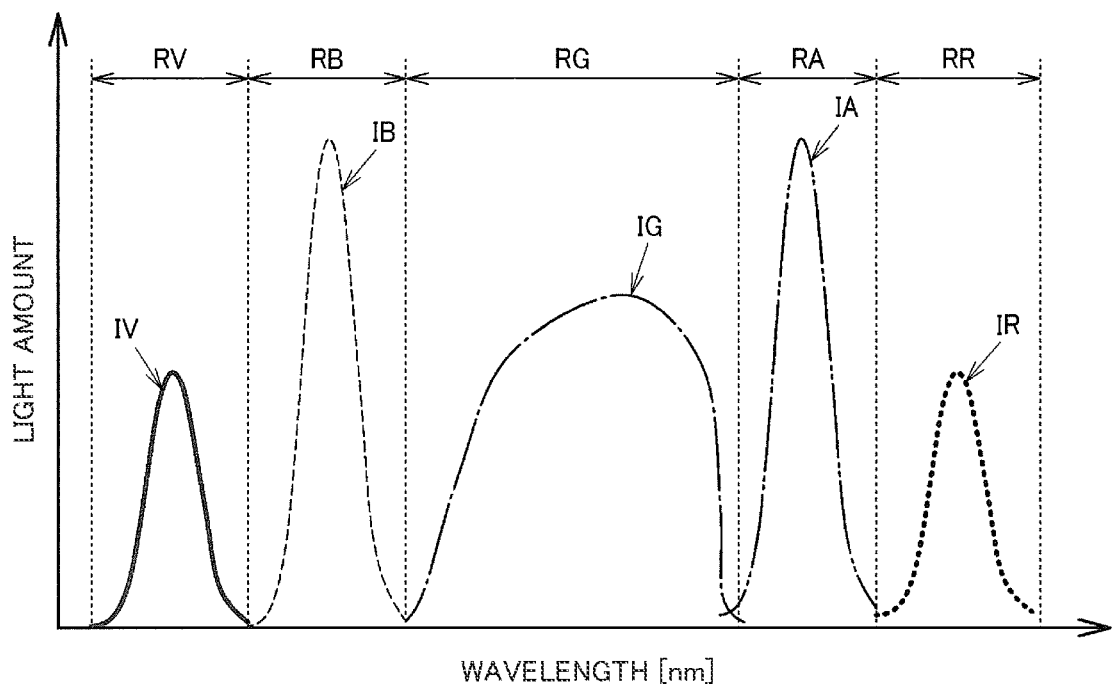
FIG. 6 illustrates a spectrum example of illumination light generated by the light source section.

FIG. 5 illustrates a detailed configuration example of the light source section 140 and the processing circuit 120. FIG. 6 illustrates a spectrum example of illumination light generated by the light source section 140. Note that in FIG. 5, only the connector of the scope 200 and the light guide 214 are illustrated, and other components are omitted.

The light source section 140 includes light sources LDV, LDB, LDG, LDA, and LDR, and an optical multiplexing section 141. The light source section 140 may further include a lens or the like for changing distribution of light from the light source or converting light into parallel light.

As illustrated in FIG. 6, the light source LDV emits light IV having a peak wavelength in the violet region RV. Similarly, the light sources LDB, LDG, LDA, and LDR emit light IB, light IG, light IA, and light IR, respectively, having peak wavelengths in the blue region RB, the green region RG, the amber region RA, and the red region RR, respectively. A light amount of illumination light in the violet region RV is a value obtained by integrating light amounts of light IV in the violet region RV. Similarly, a light amount of the blue region RB, a light amount of the green region RG, a light amount of the amber region RA, and a light amount of the red region RR are values obtained by integrating light amounts of light IB in the blue region RB, light amounts of light IG in the green region RG, light amounts of light IA in the amber region RA, and light amounts of light IR in the red region RR, respectively.

The optical multiplexing section 141 multiplexes light in the five colors described above, and causes the light to be incident on an incident end of the light guide 214. The optical multiplexing section 141 corresponds to dichroic filters DC1 to DC4 that multiplex light IV, light IB, light IG, light IA, and light IR. Alternatively, the optical multiplexing section 141 may be an optical fiber or an optical fiber bundle having five incident ends and one exit end. Light incident on the light guide 214 is guided by the light guide 214 to a leading end of the scope, and is emitted toward the object.

The light sources LDV and LDB are indium gallium nitride (InGaN)-based light emitting diodes (LEDs). The light sources LDA and LDR are aluminum gallium indium phosphide (AlGaInP)-based LEDs. The light source LDG is a so-called hybrid-type LED that emits green light from a phosphor that is applied onto a light emission surface of the LED with light from the InGaN-based blue LED serving as excitation light. Note that these are merely examples of the light sources, and various kinds of LEDs, a semiconductor laser or a hybrid light source can be adopted.

Each LED of the light sources LDV, LDB, LDA, and LDR generates narrow wavelength region light having a half-value width of about 20 to 40 nm. The LED of the light source LDG emits relatively broad, wide wavelength region light having a half-value width of 50 nm or more. Peak wavelengths of light emitted from the light sources LDV, LDB, LDG, LDA, and LDR are 415 nm, 460 nm, 540 nm, 600 nm, and 630 nm, respectively.

The endoscope apparatus 10 may have a normal light observation mode and a special light observation mode, in addition to the merkmal highlighting mode for increasing visibility of the merkmal. In the normal light observation mode, the light source section 140 causes all of the five light sources to emit light with a predetermined color balance, and thereby emits white light. In the special light observation mode, the light source section 140 causes a predetermined light source among the five light sources to emit light with a predetermined light amount ratio, and thereby emits special light.

A method of indirectly increasing visibility of the region of interest in the merkmal highlighting mode is described below.

Since the merkmal observed ratio that is expressed by (the spectral reflectance in β carotene)/(the spectral reflectance in the large intestine) is about 0.8 to 0.9, which is relatively close to 1, in the violet region RV and the red region RR, the visibility increasing effect of the light sources LDV and LDR is small. Since the merkmal observed ratio in the amber region RA is about 0.5, the light source LDA can increase visibility to a certain extent, but the effect is limited as compared with the light sources LDB and LDG. Since the merkmal observed ratio in the blue region RB and the green region RG is as extremely small as about one-several tenths, the light sources LDB and LDG can be expected to exhibit the visibility increasing effect. That is, in the image formed by illumination light having this wavelength, reflected light from tissues of the large intestine serving as the peripheral region accounts for approximately 20% to 40%, while reflected light from β carotene serving as the merkmal accounts for several precents or less. For this reason, when looking at an image of the surface of the large intestine in which β carotene is present, only β carotene is drawn as a dark image. β carotene is the merkmal for nerves. As a result, the neighborhood of nerves is drawn as a dark image.

A memory 114 stores the spectrum setting information based on the above-mentioned merkmal observed ratio. The memory 114 is a semiconductor memory such as a random-access memory (RAM) and a non-volatile memory. The control circuit 110 reads out the spectrum setting information from the memory 114, and transfers the spectrum setting information to the light source controller 150. The light source controller 150 sets a light amount ratio among the light sources LDV, LDB, LDG, LDA, and LDR based on the spectrum setting information. Several examples of setting the light amount ratio are described below. The light amount ratio is described as a:b:c:d:e, a, b, c, d, and e correspond to the light sources LDV, LDB, LDG, LDA, and LDR, respectively.

Figure 7:
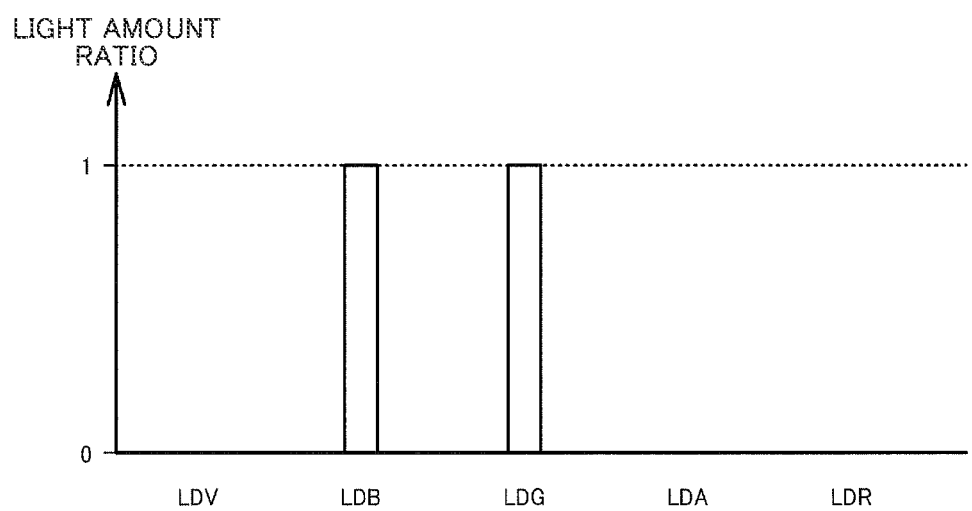
FIG. 7 illustrates a first example of a light amount ratio in accordance with a first embodiment.

FIG. 7 illustrates a first example of the light amount ratio. In the first example, the light source controller 150 turns on the light sources LDB and LDG that emit visibility increasing light, and turns off the light sources LDV, LDA, and LDR. For example, the spectrum setting information indicates the light amount ratio of 0:1:1:0:0, the light amount ratio of the light sources LDB and LDG is not limited to 1:1.

According to the first example, the surface of the large intestine and β carotene can be drawn in blue green and black, respectively, in the captured image. This increases visibility of β carotene drawn in black, and indirectly increases visibility of nerves.

Figure 8:
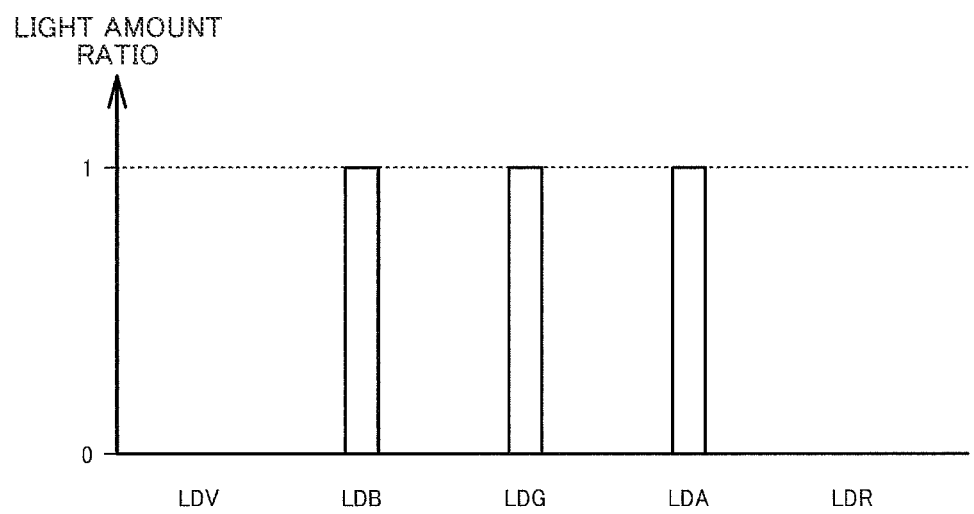
FIG. 8 illustrates a second example of a light amount ratio in accordance with the first embodiment.

FIG. 8 illustrates a second example of the light amount ratio. In the second example, the light source controller 150 causes the light sources LDB and LDG, and the light source LDA that emits quasi-visibility increasing light to emit light and turns off the light sources LDV and LDR. For example, the spectrum setting information indicates the light amount ratio of 0:1:1:1:0, but the light amount ratio of the light sources LDB, LDG, and LDA is not limited to 1:1:1.

In accordance with the second example, the surface of the large intestine can be drawn in a relatively natural color including blue, green, and amber, and β carotene can be drawn in dark amber. By setting the light amount ratio of the light sources LDB, LDG, and LDA to approximately 1:1:1, the image of the large intestine can be an image having a tone relatively close to that when the large intestine is observed with normal light.

Figure 9:
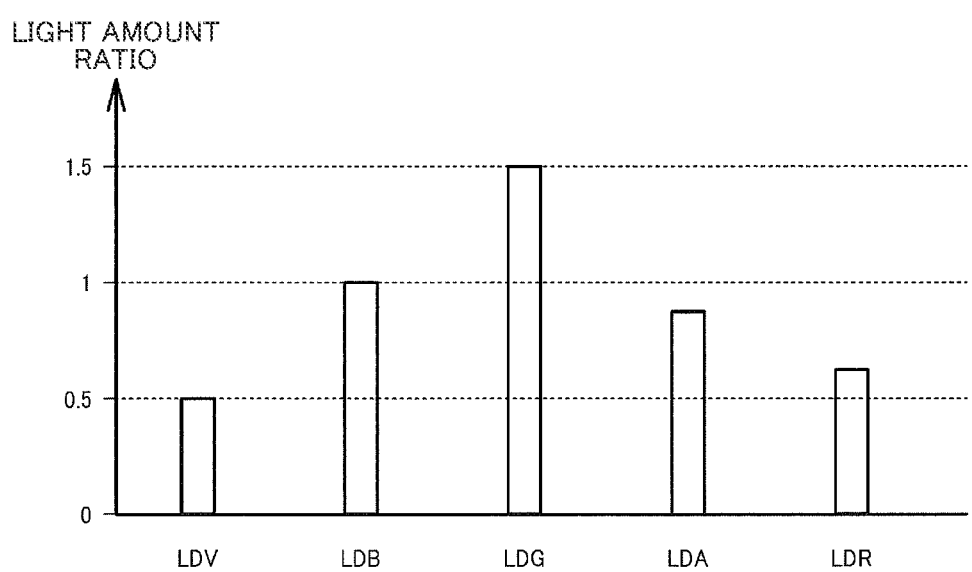
FIG. 9 illustrates a third example of a light amount ratio in accordance with the first embodiment.

FIG. 9 illustrates a third example of the light amount ratio. In the third example, the light source controller 150 causes all of the light sources LDV, LDB, LDG, LDA, and LDR to emit light. The light sources LDV and LDR make almost no contribution to increase of visibility of β carotene, but gives almost no adverse effect on visibility of β carotene. In contrast, by causing the light sources LDV and LDR to emit light, a shade of color of the large intestine can be further approximated to a shade of color when the large intestine is observed with normal light. For example, the spectrum setting information indicates the light amount ratio of 0.5:1:1.5:0.9:0.6. However, the light amount ratio of RGB, that is, (light emission amount of the light sources LDV and LDB):(light emission amount of the light source LDG):(light emission amount of the light sources LDA and LDR) is only required to be approximately 1:1:1. While both of the light sources LDV and LDR are caused to emit light in the above description, only either the light source LDV or the light source LDR may be caused to emit light.

In accordance with the third example, with the usage of one of or both of the light sources LDV and LDR, it is possible to approximate a shade of color to that at the time of normal light observation while maintaining the effect of increasing visibility of the merkmal. That is, color representation of the large intestine that is substantially equivalent to that at the time of normal light observation becomes possible, and β carotene is drawn in red, which is a remaining color of the five colors excluding green and blue. At this time, setting a light emission amount of LDV≈a light emission amount of LDR<a light emission amount of LDA<a light emission amount of LDG≈a light emission amount of LDB can enhance the visibility increasing effect. When visible light is divided into RGB, setting a ratio of RGB to be approximately 1:1:1 enables obtaining of a natural image that is close to a normal light image.

In accordance with the above-mentioned present embodiment, when the merkmal observed ratio in the k-th wavelength region is lower than the merkmal observed ratio in a j-th wavelength region, the light source controller 150 increases an emitted light amount of a k-th light source to be larger than an emitted light amount of a j-th light source. That is, in the k-th wavelength region, the merkmal observed ratio is lower than 1, and lower than the region-of-interest observed ratio.

In the first embodiment, each of k and j is an integer that is equal to or greater than 1 and equal to or less than 5. For example, the violet region RV, the blue region RB, the green region RG, the amber region RA, and the red region RR may serve as first, second third, fourth, and fifth wavelength regions, respectively. Accordingly, the light sources LDV, LDB, LDG, LDA, and LDR may serve as first, second, third, fourth, and fifth light sources, respectively. The k-th wavelength region is the blue region RB, the green region RG, or the amber region RA, and the j-th wavelength region is the violet region RV or the red region RR. In any of the first to third examples described above, the emitted light amount of each of the light sources LDB and LDG is larger than the emitted light amount of each of the light sources LDV and LDR. In each of the second and third examples, the emitted light amount of the light source LDA is larger than the emitted light amount of each of the light sources LDV and LDR.

Note that when a degree of disassociation of the merkmal observed ratio in the i-th wavelength region from 1 is greater than a degree of disassociation of the merkmal observed ratio in the j-th wavelength region from 1, the light source controller 150 may increase the emitted light amount of the i-th light source to be larger than the emitted light amount of the j-th light source.

As described above, the light source controller 150 sets a larger light amount of a light source as the merkmal observed ratio in a wavelength region of light emitted from the light source is further away from 1. The wavelength region in which the merkmal observed ratio is further away from 1 is considered to make more contribution to increase of visibility. For this reason, in accordance with the present embodiment, increasing the light amount more in the wavelength region in which the merkmal observed ratio is further away from 1 enables increase of visibility of the merkmal and indirect presentation of presence of the region of interest to the user.

The processing circuit 120 in accordance with the present embodiment includes the memory 114 that stores the spectrum setting information. The light source controller 150 sets an emitted light amount of each light source based on the spectrum setting information stored in the memory 114.

With this configuration, the spectrum setting information is preliminarily created based on the merkmal observed ratio and stored in the memory 114, and the light amount ratio can be set based on the spectrum setting information. Alternatively, the user inputs the spectrum setting information via the input section 600, the spectrum setting information is stored in the memory 114, and the light amount ratio can be set based on the spectrum setting information.

In the present embodiment, the plurality of light sources included in the light source section 140 is the violet light source (LDV) that emits light in the violet region RV, the blue light source (LDB) that emits light in the blue region RB, the green light source (LDG) that emits light in the green region RG, the amber light source (LDA) that emits light in the amber region RA, and the red light source (LDR) that emits light in the red region RR.

In this manner, with the usage of the plurality of independent light sources that emits light in the respective color regions, it is possible to independently set the light amount of each color region. Accordingly, it is possible to freely set the spectral shape of illumination light, and implement the optimal spectral shape of illumination light for increasing visibility of the merkmal.

In the present embodiment, the light source controller 150 increases the emitted light amount of each of the blue light source and the green light source to be larger than the emitted light amount of each of the violet light source and the red light source.

With this processing, in a case where the region of interest is nerves, the merkmal is β carotene, and the peripheral portion is a mucosa, it is possible to relatively highlight the merkmal from the peripheral portion. This increases visibility of the merkmal, and thereby enables indirect presentation of the presence of nerves serving as the region of interest to the user.

3. First Modification of First Embodiment

Figure 10:
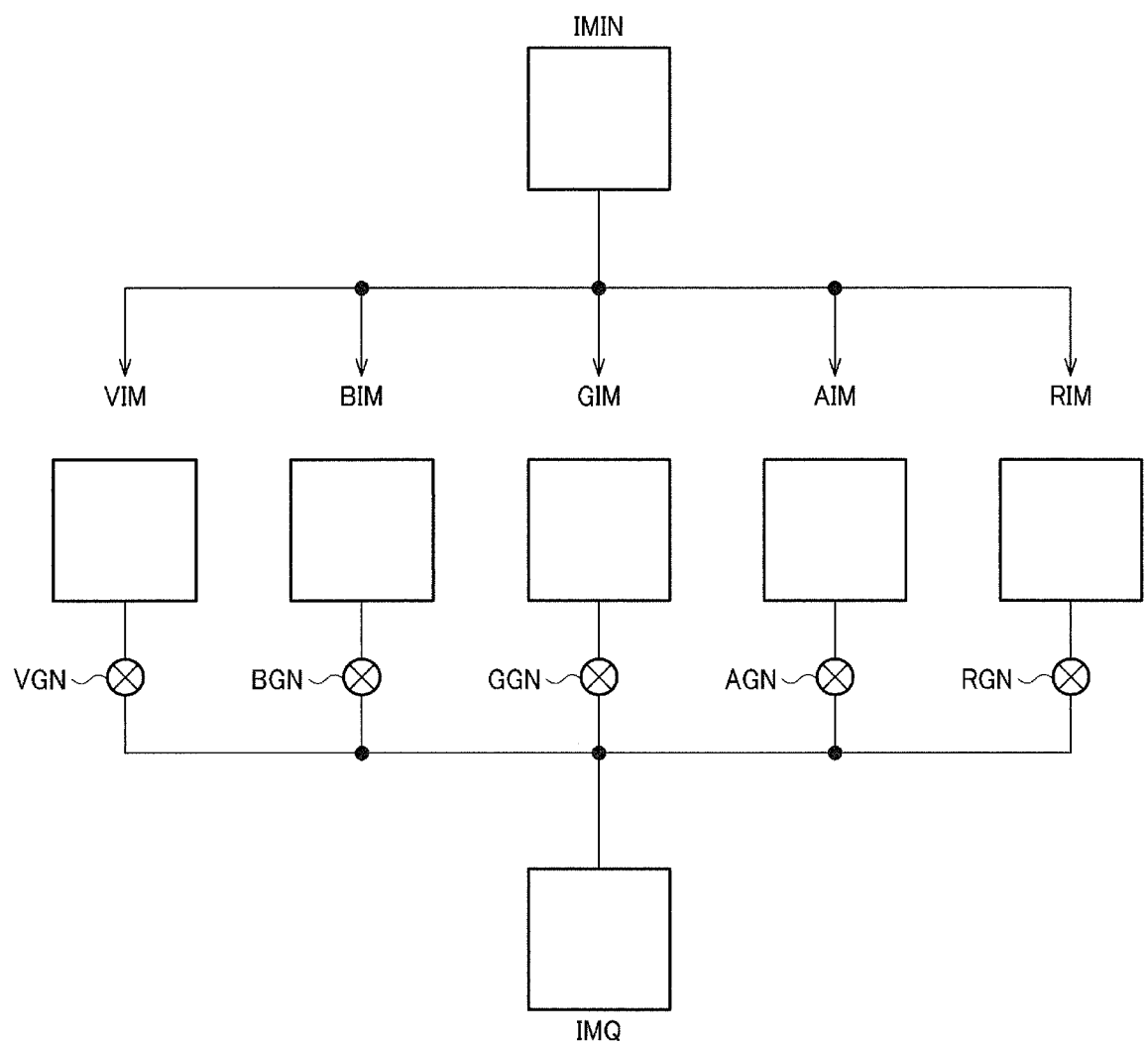
FIG. 10 is a diagram for describing an image process in accordance with a first modification of the first embodiment.

The highlighting of the merkmal in accordance with the first embodiment can be implemented also by an image process. FIG. 10 is a diagram for describing an image process in accordance with a first modification.

The light source controller 150 causes the light source section 140 to emit white light. For example, white light is light with a light amount ratio of the five light sources is approximately 1:1:1:1:1. Alternatively, white light may be light with such a light amount ratio as that reproduces a spectrum of a xenon lamp. The image processing circuit 112 generates a normal light image IMIN based on an image signal input from the imaging section 213.

The control circuit 110 reads out the spectrum setting information from the memory 114, and transfers the spectrum setting information to the image processing circuit 112. Assume that components corresponding to the violet region RV, the blue region RB, the green region RG, the amber region RA, and the red region RR in the normal light image IMIN are a violet component VIM, a blue component BIM, a green component GIM, an amber component AIM, and a red component RIM, respectively. The image processing circuit 112 extracts the color components VIM, BIM, GIM, AIM, and RIM from the normal light image, and performs a gain process on each color component based on the spectrum setting information. For example, the image processing circuit 112 converts the RGB normal light image into a YCrCb image, and extracts each color component based on a hue value of the YCrCb image.

A case where the spectrum setting information indicates the light amount ratio of 0.5:1:1.5:0.9:0.6 is used as an example. The image processing circuit 112 multiplies the color components VIM, BIM, GIM, AIM, and RIM by a gain VGN=0.5, a gain BGN=1, a gain GGN=1.5, a gain AGN=0.9, and a gain RGN=0.6, respectively, corresponding to the light amount ratio. The image processing circuit 112 converts the YCrCb image after the gain process into an RGB image, and outputs the RGB image as an output image IMQ.

The output image IMQ is an image that is equivalent to an image captured in a case where the light amount ratio of the light source section 140 is controlled based on the spectrum setting information. That is, the image process described above can also increase visibility of the merkmal similarly to a case where the light amount ratio of the light source section 140 is controlled.

In accordance with the present embodiment, when a degree of disassociation of the merkmal observed ratio in the i-th wavelength region from 1 is greater than a degree of disassociation of the merkmal observed ratio in the j-th wavelength region from 1, the image processing circuit 112 increases a gain of an i-th wavelength component among a plurality of wavelength components of the captured image to be larger than a gain of a j-th wavelength component. The meaning of i and j is as described above in the first embodiment.

In the present embodiment, the violet component, the blue component, the green component, the amber component, and the red component of the captured image may serve as first, second third, fourth, and fifth wavelength components, respectively. In the image process corresponding to the first to third examples described in the first embodiment, the gain of each of the blue component and the green component is larger than the gain of each of the violet component and the red component. In the image process corresponding to the second and third examples, the gain of the amber component is larger than the gain of each of the violet component and the red component.

As described above, the image processing circuit 112 sets a larger gain of a component of a wavelength region, as the merkmal observed ratio in the wavelength region is further away from 1. Setting a larger gain of a component of a wavelength region in which the merkmal observed ratio is further away from 1 enables increase of visibility of the merkmal, and indirect presentation of presence of the region of interest to the user.

In the present embodiment, the image processing circuit 112 sets a gain of each wavelength component among the plurality of wavelength components based on the spectrum setting information stored in the memory 114.

With this processing, the spectrum setting information is preliminarily created based on the merkmal observed ratio and stored in the memory 114, and the gain of each wavelength component can be set based on the spectrum setting information. Alternatively, the user inputs the spectrum setting information via the input section 600, the spectrum setting information is stored in the memory 114, and the gain of each wavelength component can be set based on the spectrum setting information.

In the present embodiment, the image processing circuit 112 increases the gain of each of the blue component and the green component to be larger than the gain of each of the violet component and the red component.

With this processing, in a case where the region of interest is nerves, the merkmal is β carotene, and the peripheral portion is a mucosa, execution of the image process can relatively highlight the merkmal from the peripheral portion. This increases visibility of the merkmal, and thereby enables indirect presentation of the presence of nerves serving as the region of interest to the user.

While the description has been given of a case where the image sensor is of a simultaneous-type such as the Bayer-type and the five light sources simultaneously emit light, a method similar to the above-mentioned method can be applied to a frame sequential method. The frame sequential method will be described in the third and fourth embodiments.

4. Second Modification of First Embodiment

While the spectral shape of illumination light is set in consideration of the difference in spectral reflectances between β carotene serving as the merkmal and the large intestine serving as the peripheral portion in the first embodiment, in a second modification, the spectral shape of illumination light is set in consideration of also a difference in spectral reflectances between nerves serving as the region of interest and the large intestine serving as the peripheral portion.

As illustrated in FIG. 4, the region-of-interest observed ratio expressed by (the spectral reflectance in nerves)/(the spectral reflectance in the large intestine) is approximately 2.0 in each of the violet region and the blue region, approximately 1.3 in the green region, approximately 1.5 in the amber region, and approximately 1.0 in the red region. That is, light in each of the violet region, the blue region, and the amber region is quasi-visibility increasing light with respect to nerves. With respect to β carotene, light in each of the blue region and the green region is visibility increasing light, and light in the amber region is quasi-visibility increasing light. Consequently, light in each of the blue region and the amber region can either directly or indirectly increase visibility of nerves. In addition, light in the violet region exhibits a limited visibility increasing effect with respect to β carotene but can increase visibility with respect to nerves.

Figures 11, 12:
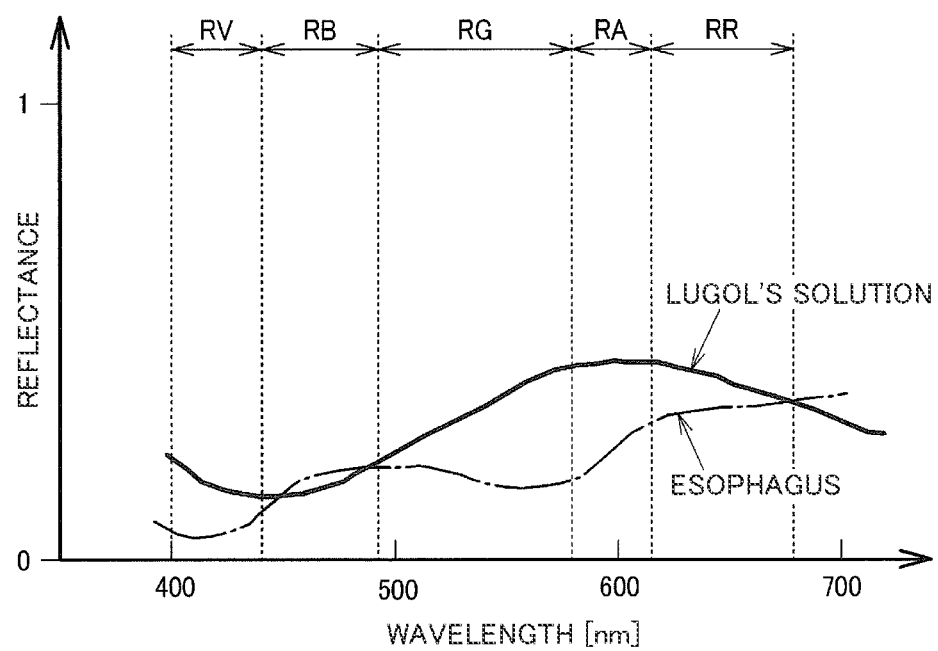
FIG. 11 is a table describing a visibility increasing effect.
FIG. 12 illustrates spectral reflectances in the esophagus and Lugol's solution.

A table illustrated in FIG. 11 summarizes the above-mentioned visibility increasing effect. "POSITIVE" represents visibility increasing light, "NEUTRAL" represents quasi-visibility increasing light, and "NEGATIVE" represents non-visibility increasing light.

Consequently, setting a light emission amount of LDR<a light emission amount of LDV<a light emission amount of LDA a light emission amount of LDG<a light emission amount of LDB can increase visibility of both nerves and β carotene. Taking into consideration also of a light amount ratio of illumination light that is close to white light, the light amount ratio is, for example, 0.6:1.2:1.8:1.4:0.4. In this case, the light amount ratio of RGB is 1:1:1.

Similarly to the first modification, the image processing circuit 112 performs a gain process corresponding to the above-mentioned light amount ratio on each color component of the captured image, and can thereby obtain an image that is equivalent to the one obtained in the second modification.

In the present embodiment, the light source controller 150 sets the spectral shape of illumination light using the spectrum setting information based on the region-of-interest observed ratio, and thereby relatively highlights the region of interest from the peripheral portion. Alternatively, the image processing circuit 112 performs the image process that highlights the region of interest based on the above-mentioned spectrum setting information in the captured image, and thereby relatively highlights the region of interest from the peripheral portion.

This enables not only relative highlighting of the merkmal from the peripheral portion, but also relative highlighting of the region of interest from the peripheral portion, although a degree of the highlighting is lower. Accordingly, the highlighting of the merkmal enables not only indirect increase of visibility of the region of interest, but also direct increase of visibility of the region of interest.

5. Third Modification of First Embodiment

While the spectral shape of illumination light is set in consideration of the difference in spectral reflectances between β carotene serving as the merkmal and the large intestine serving as the peripheral portion in the first embodiment, in a third modification, the spectral shape of illumination light is set in consideration of also a difference in spectral reflectances between nerves serving as the region of interest and β carotene serving as the merkmal.

As illustrated in FIG. 4, the merkmal-to-region-of-interest observed ratio expressed by (the spectral reflectance in nerves)/(the spectral reflectance in β carotene) is approximately 2.5 in the violet region, a few dozen in each of the blue region and the green region, approximately 3.0 in the amber region, and approximately 0.9 in the red region. That is, light in each of the blue region, the green region, and the amber region is visibility increasing light for nerves with respect to β carotene. In addition, light in the violet region is quasi-visibility increasing light for nerves with respect to β carotene. That is, light in each of the blue region, the green region, and the amber region can relatively increase visibility of nerves with respect to β carotene. Although the effect is lower than that of light in each of the blue region, the green region, and the amber region, light in the violet region can relatively increase visibility of nerves with respect to β carotene.

Consequently, setting a light emission amount of LDR<a light emission amount of LDV<a light emission amount of LDB≈a light emission amount of LDG≈a light emission amount of LDA can relatively increase visibility of nerves with respect to both β carotene and the large intestine. Taking into consideration also of the light amount ratio of illumination light that is close to white light, the light amount ratio is, for example, 0.4:1.4:1.8:1.6:0.2. In this case, the light amount ratio of RGB is 1:1:1.

Similarly to the first modification, the image processing circuit 112 performs a gain process corresponding to the above-mentioned light amount ratio on each color component of the captured image, and can thereby obtain an image that is equivalent to the one obtained in the third modification.

In accordance with the present embodiment, the light source controller 150 sets the spectral shape of illumination light using the spectrum setting information based on the merkmal-to-region-of-interest observed ratio, and thereby relatively highlights the region of interest from the merkmal. Alternatively, the image processing circuit 112 performs an image process that highlights the region of interest based on the above-mentioned spectrum setting information in the captured image, and thereby relatively highlights the region of interest from the merkmal.

This enables not only relative highlighting of the merkmal from the peripheral portion, but also relative highlighting of the region of interest from the merkmal, although a degree of the highlighting is lower. Accordingly, the highlighting of the merkmal enables not only indirect increase of visibility of the region of interest, but also direct increase of visibility of the region of interest in a region where the merkmal is present. For example, there can be a case where nerves are present in fat and a case where nerves are not present in fat. In these cases, relatively highlighting the region of interest from the merkmal can increase visibility indicating whether or not the region of interest is actually present in the presence area of the merkmal.

6. Second Embodiment

Subsequently, the second embodiment is described. A configuration of the endoscope apparatus 10, and a detailed configuration of the light source section 140 and the processing circuit 120 are similar to those illustrated in FIGS. 1 and 5. In the second embodiment, a difference from the first embodiment is mainly described.

In the second embodiment, a description will be given of a case of performing dyeing with Lugol's solution in examination of an esophageal cancer as an example. The dyeing with Lugol's solution is an operative method for increasing visibility to detect the esophageal cancer. Since the Lugol's solution is hard to adhere to the esophagus cancer and adheres to a region other than the esophagus cancer, there is a possibility of the esophagus cancer in an unstained area in which there is no Lugol's solution. In the dyeing with Lugol's solution, it is important to check a boundary between the cancer and normal tissues. In the present embodiment, a description is given of a method of checking the boundary between the Lugol's solution and the normal tissues with good visibility. In the second embodiment, the region of interest is the esophagus cancer, the merkmal is the Lugol's solution, and the peripheral portion is an esophagus mucosa. The Lugol's solution is one example of the merkmal that is present exclusively in the neighborhood of the region of interest, that is, one example of the region-of-interest exclusive component.

FIG. 12 illustrates spectral reflectances in the esophagus and the Lugol's solution. The spectral reflectance in the esophagus is the spectral reflectance in the esophagus mucosa that is not dyed with the Lugol's solution.

In the second embodiment, the merkmal observed ratio is expressed by (the spectral reflectance in the Lugol's solution)/(the spectral reflectance in the esophagus). As illustrated in FIG. 8, the merkmal observed ratio is approximately 2.5 in the violet region RV, approximately 1.0 in the blue region RB, approximately 1.8 in the green region RG, approximately 2.0 in the amber region RA, and approximately 1.2 in the red region RR. That is, light in each of the violet region RV, the green region RG, and the amber region RA is quasi-visibility increasing light for the Lugol's solution with respect to the esophagus. Note that since a cancer portion has a spectral reflectance approximately similar to that of the esophagus, it is difficult to discriminate between the cancer portion and normal esophagus tissues. Specifically, the region-of-interest observed ratio expressed by (the spectral reflectance in the esophagus cancer)/(the spectral reflectance in the esophagus) is approximately 1 in each color region, and closer to 1 than the merkmal observed ratio.

Several examples of setting the light amount ratio are described below. The light amount ratio is described below as a:b:c:d:e, a, b, c, d, and e correspond to the light sources LDV, LDB, LDG, LDA, and LDR, respectively.

Figure 13:
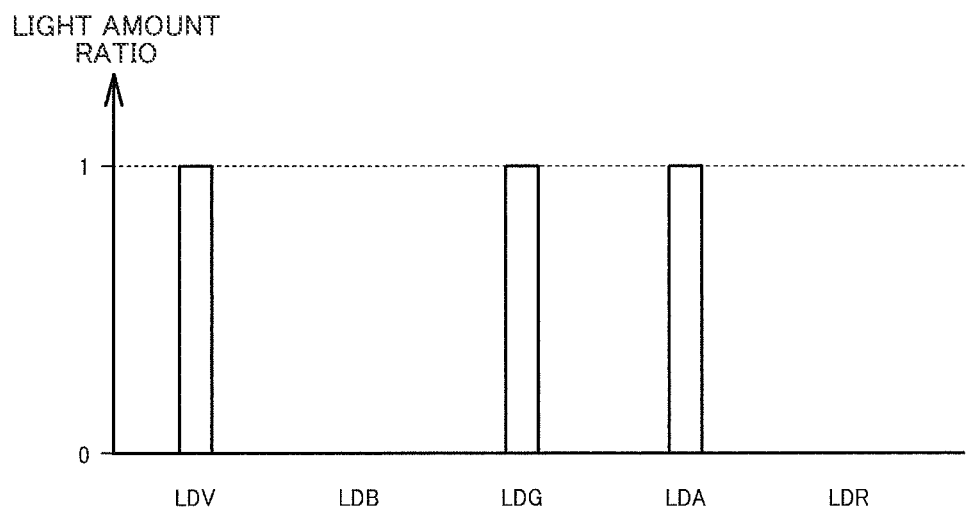
FIG. 13 illustrates a first example of a light amount ratio in accordance with a second embodiment.

FIG. 13 illustrates a first example of the light amount ratio. In the first example, the light source controller 150 turns on the light sources LDV, LDG, and LDA that emit quasi-visibility increasing light, and turns off the light sources LDB and LDR. For example, the spectrum setting information indicates the light amount ratio of 1:0:1:1:0, but the light amount ratio of the light sources LDV, LDG, and LDA is not limited to 1:1:1.

In accordance with the first example, increasing visibility of the Lugol's solution with respect to the esophagus mucosa can increase visibility of the esophagus cancer serving as the region of interest. That is, since the esophagus cancer and the esophagus mucous have similar optical spectra, spectrally differentiating the esophagus mucous and the Lugol's solution spectrally differentiates the esophagus cancer and the Lugol's solution. Since the Lugol's solution adheres to a normal mucosa, a boundary between the esophagus cancer and the normal mucosa becomes easier to be visibly recognized. Although the present embodiment uses only quasi-visibility increasing light, the merkmal observed ratio of 1.8 or more is secured, and thus it can be expected to obtain a sufficient effect.

Figure 14:
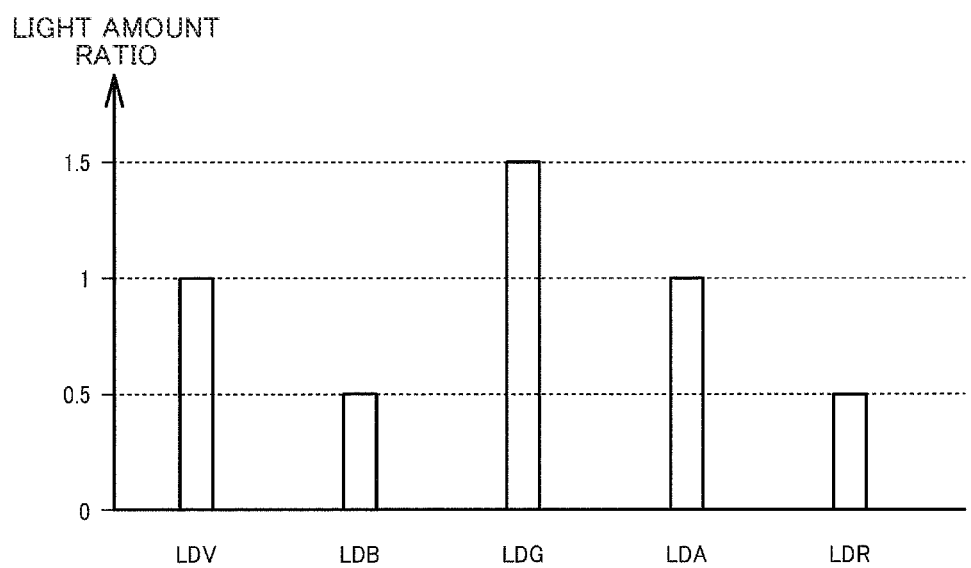
FIG. 14 illustrates a second example of a light amount ratio in accordance with the second embodiment.

FIG. 14 illustrates a second example of the light amount ratio. In the second example, the light source controller 150 causes all of the light sources LDV, LDB, LDG, LDA, and LDR to emit light. The light sources LDB and LDR make almost no contribution to increase of visibility of the Lugol's solution, but gives almost no adverse effect on visibility of the Lugol's solution. In contrast, by causing the light sources LDB and LDR to emit light, shades of color of the esophagus mucosa and the esophagus cancer can be further approximated to a shade of color when the esophagus mucosa and the esophagus cancer are observed with normal light. For example, the spectrum setting information indicates the light amount ratio of 1:0.5:1.5:1:0.5. However, the light amount ratio of RGB is only required to be approximately 1:1:1. While both of the light sources LDB and LDR are caused to emit light in the above description, only either the light source LDB or the light source LDR may be caused to emit light.

In accordance with the second example, with the usage of one of or both of the light sources LDB and LDR, it is possible to approximate the shade of color to that at the time of normal light observation while maintaining the effect of increasing visibility of the merkmal. At this time, setting a light emission amount of LDB≈a light emission amount of LDR<a light emission amount of LDV a light emission amount of LDG a light emission amount of LDA can enhance the visibility increasing effect. When visible light is divided into RGB, setting a ratio of RGB to be approximately 1:1:1 enables obtaining of a natural image that is close to the normal light image.

Similarly to the first modification of the first embodiment, the image processing circuit 112 performs a gain process corresponding to the above-mentioned light amount ratio on each color component of the captured image, and can thereby obtain an image that is equivalent to that obtained in the second embodiment.

In accordance with the above-mentioned present embodiment, the light source controller 150 increases the emitted light amount of each of the violet light source (LDV), the green light source (LDG), and the amber light source (LDA) to be larger than the emitted light amount of each of the blue light source (LDB) and the red light source (LDR).

Alternatively, in the present embodiment, the image processing circuit 112 may increase the gain of each of the violet component, the green component, and the amber component larger than the gain of each of the blue component and the red component.

With this processing, in a case where the region of interest is the esophagus cancer, the merkmal is the Lugol's solution, and the peripheral portion is the esophagus mucosa, it is possible to relatively highlight the merkmal from the peripheral portion. This can increase visibility of the esophagus cancer serving as the region of interest and having a spectral feature that is close to that of the Lugol's solution serving as the merkmal.

7. Third Embodiment

The five light sources are caused to simultaneously emit light in the first and second embodiments. In the third embodiment, the five light sources are caused to sequentially emit light. A method of causing the light sources to sequentially emit light, capturing images when the respective light sources emit light, and combining the images into a color image is referred to as the frame sequential method. A configuration of the endoscope apparatus 10 is similar to that illustrated in FIG. 1. In the third embodiment, a difference from the first and second embodiments is mainly described.

Figure 15:
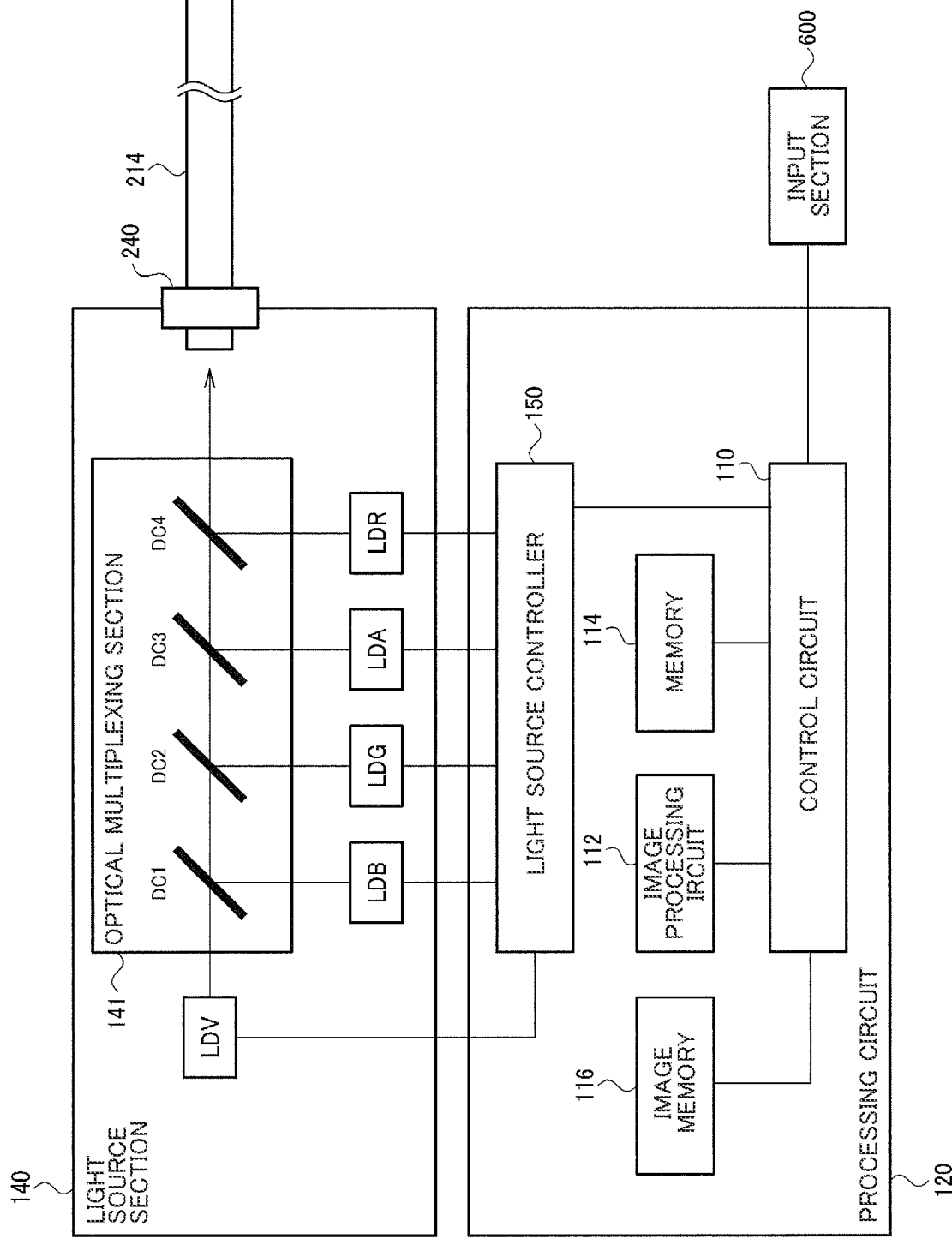
FIG. 15 illustrates a detailed configuration example of a processing circuit in accordance with a third embodiment.

FIG. 15 illustrates a detailed configuration example of the processing circuit 120 in accordance with the third embodiment. A configuration of the light source section 140 is similar to that of the first embodiment. In the third embodiment, the processing circuit 120 further includes an image memory 116.

The light source controller 150 causes the light sources LDV, LDB, LDG, LDA, and LDR to emit light one by one. For example, the light source controller 150 sequentially turns on LDV, LDB, LDG, LDA, and LDR in this order, but the order of turning-on is not limited thereto. The imaging section 213 performs imaging at a light emission timing of each light source.

Figure 16:
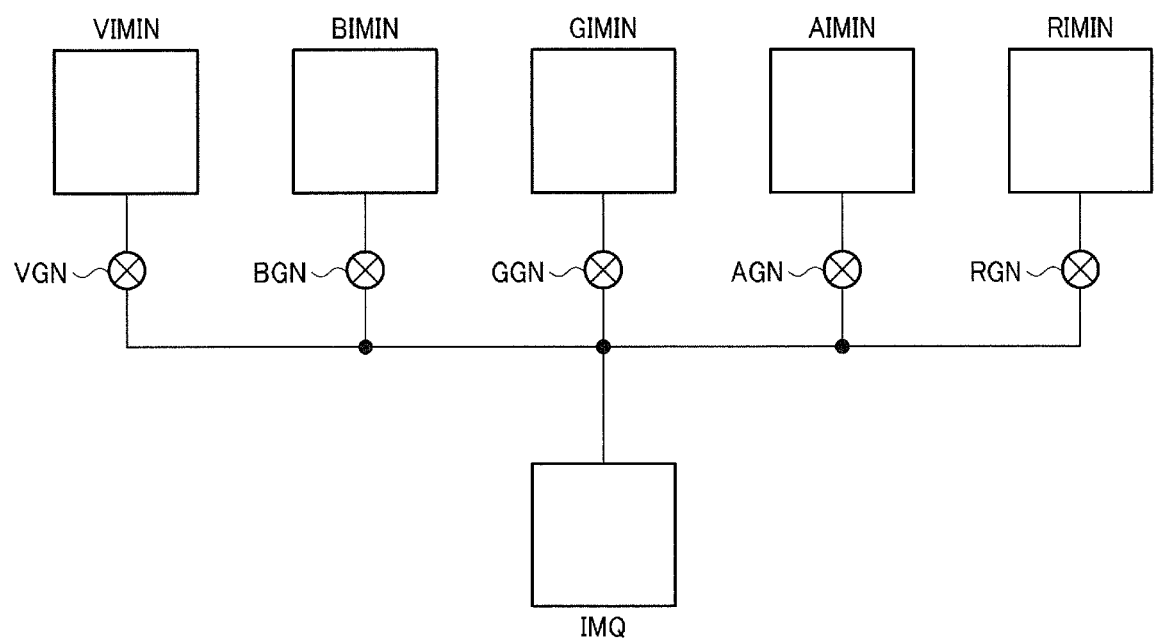
FIG. 16 is a diagram for describing an image process in accordance with the third embodiment.

FIG. 16 is a diagram for describing an image process in accordance with the third embodiment. The image processing circuit 112 generates an image VIMIN based on an image signal acquired by the imaging section 213 at a light emission timing of LDV. Similarly, the image processing circuit 112 generates images BIMIN, GIMIN, AIMIN, and RIMIN, based on image signals acquired by the imaging section 213 at light emission timings of LDB, LDG, LDA, and LDR, respectively. The images VIMIN, BIMIN, GIMIN, AIMIN, and RIMIN correspond to wavelength components corresponding to the wavelength regions RV, RB, RG, RA, and RR, respectively.

The image memory 116 temporarily stores the sequentially generated images VIMIN, BIMIN, GIMIN, AIMIN, and RIMIN. The image memory 116 is a semiconductor memory such as a RAM.

The image processing circuit 112 multiplies the images VIMIN, BIMIN, GIMIN, AIMIN, and RIMIN read out from the image memory 116 by the gain VGN, the gain BGN, the gain GGN, the gain AGN, and the gain RGN, respectively, corresponding to the light amount ratio. The image processing circuit 112 combines the five images after the gain process, and outputs a result as the output image IMQ.

In the normal light observation mode, the image processing circuit 112 uses a gain corresponding to a spectrum of white light to generate a white light image as the output image IMQ.

In the merkmal highlighting mode, the image processing circuit 112 uses gains corresponding to the light amount ratio described in the first embodiment or gains corresponding to the light amount ratio described in the second embodiment to generate the output image IMQ in which the merkmal is highlighted. The light amount ratio used for highlighting the merkmal is as described in the first and second embodiments. Similarly to the actions and effects described in the first and second embodiments, relatively increasing visibility of the merkmal from the peripheral portion can indirectly increase visibility of the region of interest also in the third embodiment.

Note that each of the five images is multiplied by a gain in FIG. 16, but a method of the image process is no limited thereto. For example, the third embodiment may employ a configuration of, among the five images, not selecting an image with a gain of zero and selecting an image with a gain that is not zero, and multiplying the selected image by a gain.

In addition, the merkmal is highlighted by the image process in FIG. 16, but may be highlighted by setting of the light amount ratio. That is, the light source controller 150 may cause the light sources to sequentially emit light with the light amount ratio described in the first and second embodiments, and thereby highlight the merkmal.

8. Fourth Embodiment

The five light sources are caused to sequentially emit light in the third embodiment. In the fourth embodiment, the five light sources are divided into three groups, and are caused to sequentially emit light on a group-by-group basis. A configuration of the endoscope apparatus 10 is similar to that in FIG. 1, and a detailed configuration of the light source section 140 and the processing circuit 120 is similar to that illustrated in FIG. 15. In the fourth embodiment, a difference from the first to third embodiments is mainly described.

The light source controller 150 causes each of the light sources LDV and LDB belonging to a first group, the light source LDG belonging to a second group, the light sources LDA and LDR belonging to a third group to emit light on the group-by-group basis. When the visible light wavelength region is divided into three regions of RGB, the first group corresponds to the B region, the second group corresponds to the G region, and the third group corresponds to the R region. For example, the light source controller 150 sequentially turns on the first, second, and third groups in this order, but the order of turning-on is not limited thereto. The imaging section 213 performs imaging at a light emission timing of each group.

The image processing circuit 112 generates a B image based on an image signal acquired by the imaging section 213 at a light emission timing of the first group. Similarly, the image processing circuit 112 generates G and R images based on image signals acquired by the imaging section 213 at light emission timings of the second and third groups, respectively. The image memory 116 temporarily stores the sequentially generated B, G, and R images. The image processing circuit 112 combines the B, G, and R images read out from the image memory 116, and outputs a result as the output image IMQ.

The light source controller 150 causes the light sources LDV, LDB, LDG, LDA, and LDR to sequentially emit light on the group-by-group basis with the light amount ratio described in the first embodiment or the light amount ratio described in the second embodiment.

Similarly to the actions and effects described in the first and second embodiments, relatively increasing visibility of the merkmal from the peripheral portion can indirectly increase visibility of the region of interest also in the fourth embodiment. Since a five frame sequential method is used in the third embodiment, and a three frame sequential method is used in the fourth embodiment, the fourth embodiment is less susceptible to motion blur of the object. Accordingly, the fourth embodiment is less likely to generate a sense of incongruity in motion in the image.

While highlighting of the merkmal is performed only with the light amount ratio in the above description, the highlighting of the merkmal may be performed by combining the light amount ratio and the image process. That is, the light source controller 150 controls only a light amount ratio in each group, but does not control a light amount ratio between groups. Specifically, the light source controller 150 controls each of a light amount ratio of the light sources LDV and LDB and a light amount ratio of the light sources LDA and LDR based on the spectrum setting information, but causes the light source LDG to emit light with a predetermined light amount regardless of the spectrum setting information. The image processing circuit 112 multiplies each of the B, G, and R images by a gain that reproduces a light amount ratio between the groups, and combines images after the multiplication to generate the output image.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

What is claimed is:

1. A light source device for generating illumination light to be emitted toward an observation object, the light source device comprising:
   a first light source configured to emit light having a peak wavelength in a first wavelength region as part of the illumination light;
   a second light source configured to emit light having a peak wavelength in a second wavelength region as part of the illumination light; and
   a processor comprising hardware, wherein the processor is configured to:
      acquire spectrum setting information from a memory; and
      control, based on the spectrum setting information, an emitted light amount of the first light source and an emitted light amount of the second light source so that the emitted light amount of the first light source becomes larger than the emitted light amount of the second light source,
   wherein:
      the observation object includes a region of interest, a merkmal, and a peripheral portion;
      the merkmal represents a component being present in an area outside of the region of interest, the area being correlated to an area in which the region of interest is present;
      the peripheral portion represents outside of the region of interest, and excludes the merkmal;
      the spectrum setting information is set based on a merkmal observed ratio that is preset;
      the merkmal observed ratio is a ratio between a spectral reflectance in the merkmal and a spectral reflectance in the peripheral portion in each of a plurality of wavelength regions divided from a visible light wavelength region; and
      a degree of disassociation of the merkmal observed ratio in the first wavelength region from 1 is greater than a degree of disassociation of the merkmal observed ratio in the second wavelength region from 1, and
   wherein, when a ratio between a spectral reflectance in the region of interest included in the observation object and the spectral reflectance in the peripheral portion in each of the plurality of wavelength regions is regarded as a region-of-interest observed ratio that is preset, in the first wavelength region, the degree of disassociation of the merkmal observed ratio from 1 is greater than a degree of disassociation of the region-of-interest observed ratio from 1.

2. The light source device as defined in claim 1, wherein, in the second wavelength region, a degree of disassociation of the merkmal observed ratio from 1 is greater than a degree of disassociation of the region-of-interest observed ratio from 1.

3. The light source device as defined in claim 1, further comprising:
   the memory that stores the spectrum setting information,
   wherein the processor is configured to set, based on the spectrum setting information stored in the memory, the emitted light amount of the first light source and the emitted light amount of the second light source.

4. The light source device as defined in claim 1, wherein the plurality of wavelength regions includes a violet region, a blue region, a green region, an amber region, and a red region.

5. The light source device as defined in claim 4, wherein:
   the region of interest is nerves, the merkmal is β carotene, and the peripheral portion is a mucosa; and the processor is configured to increase each of an emitted light amount of a blue light source that emits light in the blue region and an emitted light amount of a green light source that emits light in the green region to be larger than each of an emitted light amount of a violet light source that emits light in the violet region and an emitted light amount of a red light source that emits light in the red region.

6. The light source device as defined in claim 4, wherein:
   the region of interest is an esophagus cancer, the merkmal is Lugol's solution, and the peripheral portion is an esophagus mucosa; and
   the processor is configured to increase each of an emitted light amount of a violet light source that emits light in the violet region, an emitted light amount of a green light source that emits light in the green region, and an emitted light amount of an amber light source that emits light in the amber region to be larger than each of an emitted light amount of a blue light source that emits light in the blue region and an emitted light amount of a red light source that emits light in the red region.

7. The light source device as defined in claim 1, wherein the merkmal observed ratio of light in the first wavelength region is lower than 0.75, or greater than 1.5.

8. The light source device as defined in claim 1, wherein the first wavelength region is a green region, and the second wavelength region is a blue region.

9. The light source device as defined in claim 1, further comprising:
   a third light source configured to emit light having a peak wavelength in a blue region serving as a third wavelength region,
   wherein the first wavelength region is a green region, and the second wavelength region is a red region.

10. The light source device as defined in claim 1, wherein, when a ratio of a spectral reflectance in the region of interest and the spectral reflectance in the peripheral portion in each of the plurality of wavelength regions is regarded as a region-of-interest observed ratio, the processor is configured to:
    set a spectral shape of the illumination light by using the spectrum setting information based on the region-of-interest observed ratio to relatively highlight the region of interest from the peripheral portion, or
    perform an image process that highlights the region of interest in an image captured with the observation object based on the spectrum setting information to relatively highlight the region of interest from the peripheral portion.

11. The light source device as defined in claim 1, wherein, when a ratio of the spectral reflectance in the merkmal and a spectral reflectance in the region of interest in each of the plurality of the wavelength regions is regarded as a merkmal-to-region-of-interest observed ratio, the processor is configured to:
    set a spectral shape of the illumination light by using the spectrum setting information based on the merkmal-to-region-of-interest observed ratio to relatively highlight the merkmal from the region of interest, or
    perform an image process that highlights the merkmal in an image captured with the observation object based on the spectrum setting information to relatively highlight the merkmal from the region of interest.

12. The light source device as defined in claim 4, further comprising
    an amber light source configured to emit light in the amber region,
    wherein the processor is configured to control, based on the spectrum setting information, the second light source so that the emitted light amount of the second light source becomes larger than the emitted light amount of the amber light source.

13. The light source device as defined in claim 4, further comprising:
    a violet light source configured to emit light in the violet region; and
    a red light source configured to emit light in the red region,
    wherein the processor is configured to control, based on the spectrum setting information, the second light source so that the emitted light amount of the second light source becomes larger than the emitted light amount of the violet light source and the red light source.

14. The light source device as defined in claim 4, further comprising:
    a violet light source configured to emit light in the violet region,
    wherein the processor is configured to control, based on the spectrum setting information, the second light source so that the emitted light amount of the second light source becomes twice the emitted light amount of the violet light source.

15. The light source device as defined in claim 4, further comprising:
    a violet light source configured to emit light in the violet region,
    wherein the processor is configured to control, based on the spectrum setting information, the first light source so that the emitted light amount of the first light source becomes three times the emitted light amount of the violet light source.

16. The light source device as defined in claim 4, further comprising
    a violet light source configured to emit light in the violet region;
    an amber light source configured to emit light in the amber region; and
    a red light source configured to emit light in the red region,
    wherein the processor is configured to control, based on the spectrum setting information, the violet light source, the amber light source and the red light source so that the emitted light amount of the amber light source becomes larger than the emitted light amount of the violet light source and the red light source.

* * * * *